United States Patent
Sang et al.

(10) Patent No.: US 10,875,935 B2
(45) Date of Patent: Dec. 29, 2020

(54) METHOD OF PREPARING PREGELATINIZED, PARTIALLY HYDROLYZED STARCH AND RELATED METHODS AND PRODUCTS

(71) Applicant: United States Gypsum Company, Chicago, IL (US)

(72) Inventors: Yijun Sang, Oak Park, IL (US); Weixin D. Song, Shanghai (CN); Cesar Chan, Libertyville, IL (US); Chris C. Lee, Deerfield, IL (US)

(73) Assignee: UNITED STATES GYPSUM COMPANY, Chicago, IL (US)

( * ) Notice: Subject to any disclaimer, the term of this patent is extended or adjusted under 35 U.S.C. 154(b) by 0 days.

(21) Appl. No.: 15/787,264

(22) Filed: Oct. 18, 2017

(65) Prior Publication Data

US 2018/0037671 A1 Feb. 8, 2018

Related U.S. Application Data

(63) Continuation of application No. 14/494,547, filed on Sep. 23, 2014, now Pat. No. 9,828,441, which is a continuation-in-part of application No. 14/044,582, filed on Oct. 2, 2013, now Pat. No. 9,540,810, which is a continuation-in-part of application No. 13/835,002, filed on Mar. 15, 2013.

(60) Provisional application No. 61/717,588, filed on Oct. 23, 2012.

(51) Int. Cl.
| | |
|---|---|
| *C08B 31/18* | (2006.01) |
| *C01B 15/01* | (2006.01) |
| *B01J 19/18* | (2006.01) |
| *C08B 30/14* | (2006.01) |
| *C04B 28/14* | (2006.01) |
| *E04C 2/26* | (2006.01) |
| *C04B 111/00* | (2006.01) |

(52) U.S. Cl.
CPC .............. *C08B 30/14* (2013.01); *C04B 28/14* (2013.01); *C04B 2111/0062* (2013.01); *C04B 2111/00672* (2013.01); *E04C 2/26* (2013.01); *Y02W 30/91* (2015.05); *Y10T 428/31971* (2015.04)

(58) Field of Classification Search
CPC ...................................................... C08B 30/14
USPC ........................................................... 127/38
See application file for complete search history.

(56) References Cited

U.S. PATENT DOCUMENTS

| | | |
|---|---|---|
| 1,769,519 A | 7/1930 | King et al. |
| 2,319,637 A | 5/1943 | Schopmeyer et al. |
| 2,657,163 A | 10/1953 | Ericks |
| 2,894,589 A | 7/1959 | Wimmer et al. |
| 2,965,528 A | 12/1960 | Loechl |
| 3,179,529 A | 4/1965 | Hickey et al. |
| 3,251,702 A | 5/1966 | Edwards et al. |
| 3,573,947 A | 4/1971 | Kinkade et al. |
| 3,652,294 A | 3/1972 | Marotta et al. |
| 3,671,264 A | 6/1972 | Drews et al. |
| 3,908,062 A | 9/1975 | Roberts |
| 4,009,062 A | 2/1977 | Long |
| 4,138,271 A | 2/1979 | Toshiaki et al. |
| 4,239,716 A | 12/1980 | Ishida et al. |
| 4,328,178 A | 5/1982 | Kossatz |
| 4,392,896 A | 7/1983 | Sakakibara |
| 4,455,271 A | 6/1984 | Johnson |
| 4,465,702 A | 8/1984 | Eastman et al. |
| 4,585,685 A | 4/1986 | Forry et al. |
| 4,645,548 A | 2/1987 | Take et al. |
| 4,661,161 A | 4/1987 | Jakacki et al. |
| 4,965,031 A | 10/1990 | Conroy |
| 5,085,929 A | 2/1992 | Bruce et al. |
| 5,100,475 A * | 3/1992 | Wursch .................. A23L 29/219 127/67 |
| 5,227,100 A | 7/1993 | Koslowski et al. |
| 5,320,677 A | 6/1994 | Baig |
| 5,435,851 A | 7/1995 | Kasica et al. |
| 5,534,059 A | 7/1996 | Immordino, Jr. |
| 5,643,510 A | 7/1997 | Sucech |
| 5,683,635 A | 11/1997 | Sucech et al. |
| 5,683,772 A | 11/1997 | Anderson |
| 5,688,845 A | 11/1997 | Eden et al. |
| 5,746,822 A | 5/1998 | Espinoza et al. |

(Continued)

FOREIGN PATENT DOCUMENTS

| | | |
|---|---|---|
| AU | 2014329817 B9 | 4/2015 |
| CA | 2320637 A1 | 4/2001 |

(Continued)

OTHER PUBLICATIONS

Brabender, "Viscograph-E—The standard for measurement of starch," *Company pamphlet* (2009).

(Continued)

*Primary Examiner* — Douglas B Call

(74) *Attorney, Agent, or Firm* — Greer, Burns & Crain, Ltd.; Philip T. Petti; Pradip Sahu

(57) ABSTRACT

Disclosed are methods relating to an extruded pregelatinized, partially hydrolyzed starch prepared by mixing at least water, non-pregelatinized starch, and acid to form a starch precursor. The acid can be a weak acid that substantially avoids chelating calcium ions or a strong acid in a small amount. In the method, pregelatinization and acid-modification of the starch precursor occurs in one step in an extruder. Also disclosed are methods of preparing board using the starch prepared according to the methods, as well as starches and boards prepared by various methods of the invention.

21 Claims, 3 Drawing Sheets

(56) References Cited

U.S. PATENT DOCUMENTS

| | | |
|---|---|---|
| 5,817,262 A | 10/1998 | Englert |
| 5,868,824 A | 2/1999 | Andersen et al. |
| 5,922,447 A | 7/1999 | Baig |
| 6,010,596 A | 1/2000 | Song |
| 6,030,673 A | 2/2000 | Andersen et al. |
| 6,342,284 B1 | 1/2002 | Yu et al. |
| 6,359,040 B1 | 3/2002 | Burdick |
| 6,406,537 B1 | 6/2002 | Immordino |
| 6,409,824 B1 | 6/2002 | Veeramasuneni et al. |
| 6,409,825 B1 | 6/2002 | Yu et al. |
| 6,443,258 B1 | 9/2002 | Putt et al. |
| 6,494,609 B1 | 12/2002 | Wittbold et al. |
| 6,588,254 B1 | 7/2003 | Foster et al. |
| 6,613,424 B1 | 9/2003 | Putt et al. |
| 6,632,550 B1 | 10/2003 | Yu et al. |
| 6,699,364 B2 | 3/2004 | Song et al. |
| 6,752,895 B1 | 6/2004 | Song et al. |
| 6,805,741 B1 | 10/2004 | Liu et al. |
| 6,815,049 B2 | 11/2004 | Veeramasuneni et al. |
| 6,822,033 B2 | 11/2004 | Yu et al. |
| 6,874,930 B2 | 4/2005 | Wittbold et al. |
| 6,893,752 B2 | 5/2005 | Veeramasuneni et al. |
| 7,048,794 B2 | 5/2006 | Tagge et al. |
| 7,364,015 B2 | 4/2008 | Englert et al. |
| 7,364,676 B2 | 4/2008 | Sucech et al. |
| 7,413,603 B2 | 8/2008 | Miller et al. |
| 7,731,794 B2 | 6/2010 | Yu et al. |
| 7,736,720 B2 | 6/2010 | Yu et al. |
| 7,771,851 B2 | 8/2010 | Song et al. |
| 7,803,296 B2 | 9/2010 | Miller et al. |
| 7,851,057 B2 | 12/2010 | Englert et al. |
| 7,862,687 B2 | 1/2011 | Englert et al. |
| 8,030,377 B2 | 10/2011 | Dubey et al. |
| 8,038,790 B1 | 10/2011 | Dubey et al. |
| 8,057,915 B2 | 11/2011 | Song et al. |
| 8,062,565 B2 | 11/2011 | Mueller et al. |
| 8,062,741 B2 | 11/2011 | Tonyan et al. |
| 8,070,895 B2 | 12/2011 | Engbrecht et al. |
| 8,100,226 B2 | 1/2012 | Cao et al. |
| 8,197,952 B2 | 6/2012 | Yu et al. |
| 8,257,489 B2 | 9/2012 | Yu et al. |
| 8,262,820 B2 | 9/2012 | Yu et al. |
| 8,287,962 B2 | 10/2012 | Reagan et al. |
| 8,323,785 B2 | 12/2012 | Yu et al. |
| RE44,070 E | 3/2013 | Yu et al. |
| 8,470,461 B2 | 6/2013 | Yu et al. |
| 8,475,762 B2 | 7/2013 | Li et al. |
| 8,882,943 B2 | 11/2014 | College et al. |
| 9,540,810 B2 | 1/2017 | Sang et al. |
| 9,828,441 B2 | 11/2017 | Sang et al. |
| 2002/0139082 A1 | 10/2002 | DeFord et al. |
| 2002/0152931 A1 | 10/2002 | Chienkuo |
| 2003/0049450 A1 | 3/2003 | Song et al. |
| 2004/0026002 A1 | 2/2004 | Weldon et al. |
| 2004/0231916 A1 | 11/2004 | Englert et al. |
| 2005/0005928 A1 | 1/2005 | Klingler et al. |
| 2005/0126437 A1 | 6/2005 | Tagge et al. |
| 2005/0223949 A1 | 10/2005 | Bailey, Jr. et al. |
| 2005/0225003 A1 | 10/2005 | Holderbaum et al. |
| 2006/0278132 A1 | 12/2006 | Yu et al. |
| 2006/0278133 A1 | 12/2006 | Yu et al. |
| 2007/0048490 A1 | 3/2007 | Yu et al. |
| 2007/0048549 A1 | 3/2007 | Song et al. |
| 2007/0055058 A1 | 3/2007 | Berckmans et al. |
| 2007/0059513 A1 | 3/2007 | Yu et al. |
| 2007/0102237 A1 | 5/2007 | Baig |
| 2007/0251628 A1 | 11/2007 | Yu et al. |
| 2008/0000392 A1 | 1/2008 | Blackburn et al. |
| 2008/0069762 A1 | 3/2008 | Lynn et al. |
| 2008/0070026 A1 | 3/2008 | Yu et al. |
| 2008/0090068 A1 | 4/2008 | Yu |
| 2008/0202415 A1 | 8/2008 | Miller et al. |
| 2008/0305252 A1 | 12/2008 | Cimaglio et al. |
| 2009/0142817 A1 | 6/2009 | Norman et al. |
| 2009/0173775 A1 | 7/2009 | Swoboda et al. |
| 2009/0239977 A1 | 9/2009 | Dubey et al. |
| 2009/0252941 A1 | 10/2009 | Mueller et al. |
| 2009/0253323 A1 | 10/2009 | Mueller et al. |
| 2010/0075166 A1 | 3/2010 | Gilley |
| 2010/0075167 A1 | 3/2010 | Gilley et al. |
| 2010/0139528 A1 | 6/2010 | Yu et al. |
| 2010/0221402 A1* | 9/2010 | Wang ............... C08B 30/14 426/578 |
| 2010/0229714 A1 | 9/2010 | Tonyan et al. |
| 2010/0239886 A1 | 9/2010 | Yu et al. |
| 2010/0247937 A1 | 9/2010 | Liu et al. |
| 2010/0320029 A1 | 12/2010 | Cao et al. |
| 2011/0054053 A1 | 3/2011 | Lee et al. |
| 2011/0100844 A1 | 5/2011 | Cimaglio et al. |
| 2011/0147119 A1 | 6/2011 | Cao et al. |
| 2011/0195241 A1 | 8/2011 | Yu et al. |
| 2012/0024625 A1 | 2/2012 | Cao et al. |
| 2012/0168527 A1 | 7/2012 | Li et al. |
| 2012/0170403 A1 | 7/2012 | Li et al. |
| 2012/0214887 A1 | 8/2012 | Stav et al. |
| 2012/0219785 A1 | 8/2012 | Yu et al. |
| 2012/0251813 A1 | 10/2012 | Yu et al. |
| 2012/0308463 A1 | 12/2012 | Li et al. |
| 2013/0023612 A1 | 1/2013 | Lu et al. |
| 2013/0068364 A1 | 3/2013 | Yu et al. |
| 2013/0098268 A1 | 4/2013 | Li et al. |
| 2013/0099027 A1 | 4/2013 | Li et al. |
| 2013/0099418 A1 | 4/2013 | Li et al. |
| 2013/0100759 A1 | 4/2013 | Wittbold et al. |
| 2013/0101838 A1 | 4/2013 | Yu et al. |
| 2013/0216717 A1 | 8/2013 | Rago et al. |
| 2013/0216762 A1 | 8/2013 | Chan et al. |
| 2013/0225803 A1* | 8/2013 | Hong ............... C08B 30/12 536/111 |
| 2013/0248078 A1 | 9/2013 | Yu et al. |
| 2014/0113124 A1 | 4/2014 | Sang et al. |
| 2014/0113128 A1 | 4/2014 | Sang et al. |
| 2014/0315008 A1 | 10/2014 | Francis |
| 2015/0010767 A1 | 1/2015 | Sang et al. |
| 2015/0175482 A1 | 6/2015 | Stav et al. |

FOREIGN PATENT DOCUMENTS

| | | |
|---|---|---|
| CA | 2816891 A1 | 12/2006 |
| CN | 1300309 A | 6/2001 |
| CN | 101203345 | 6/2008 |
| CN | 101203345 A | 6/2008 |
| CN | 101456915 A | 6/2009 |
| CN | 102007255 A | 4/2011 |
| CN | 103819748 A | 5/2014 |
| EP | 1148067 A1 | 10/2001 |
| FR | 2220639 A1 | 10/1974 |
| FR | 2376161 A | 7/1978 |
| GB | 1008042 | 11/1963 |
| GB | 1028890 A | 5/1966 |
| GB | 1561232 A | 2/1980 |
| JP | S50-18642 A | 2/1975 |
| JP | 61-047162 A2 | 3/1986 |
| JP | S63-221102 A | 9/1988 |
| JP | 01-287101 A | 11/1989 |
| JP | 2004-501212 A | 1/2004 |
| JP | 2010-179268 A | 8/2010 |
| JP | 2010-540400 A | 12/2010 |
| RU | 95108945 A | 3/1997 |
| RU | 2315811 C2 | 1/2008 |
| RU | 2390528 C2 | 5/2010 |
| SU | 1405706 A3 | 6/1988 |
| TW | 200922775 A | 6/2009 |
| TW | 201332933 A1 | 8/2013 |
| WO | WO 93/08014 A1 | 4/1993 |
| WO | WO 2001/19404 A1 | 3/2001 |
| WO | WO 2001/081263 A1 | 11/2001 |
| WO | WO 2002/012141 A1 | 2/2002 |
| WO | WO 2002/031287 A1 | 4/2002 |
| WO | WO 2005/060628 A2 | 7/2005 |
| WO | 2006/135707 | 12/2006 |
| WO | WO 2009/129051 A2 | 10/2009 |
| WO | WO 2011/020528 A1 | 2/2011 |
| WO | WO2012091298 * | 7/2012 |

(56) References Cited

FOREIGN PATENT DOCUMENTS

| WO | WO 2012/122102 A2 | 9/2012 |
|---|---|---|
| WO | WO 2013/174951 A1 | 11/2013 |
| WO | WO 2015/050804 A1 | 4/2015 |

OTHER PUBLICATIONS

Burrows, "A Decade's Experience of Gypsum Board Weight Reduction in the U.S.", 14. Internationale Baustofftagung 1.0197-1.0207 (Weimar, Sep. 20-23, 2000).
De Mesa, et al., Soy protein-fortified expanded extrudates: Baseline study using normal corn starch, Journal of Food Engineering (2008).
Global Gypsum Magazine, "Gypsum Process Engineering Industrial and Thermal Equipment" 7 pages (Nov. 2012).
Industrial Starch Chemistry Agro by Nature Bulletin, 1-56 (Nov. 2007).
Lee et al., "Effects of Gelatinization and Moisture Content of Extruded Starch Pellets on Morphology and Physical Properties of Microwave—Expanded Products" Cereal Chem. 77(6): 769-773 (2000).
Leszek Moscicki, Extrusion—Cooking Techniques, Wiley-VCH, Poland 215 pages (2011).
Peterson, Kurt, "Engineered Gypsum Panels, the Development and Application of Densified Zones at the Paper/Core Interface of Gypsum Panels", Proceedings of Gypsum 2000, 6th International Conference on Natural and Synthetic Gypsum, Toronto, Canada, pp. 9-1-9-16 (May 2000).
International Searching Authority, International Search Report and Written Opinion relative to related International Application No. PCT/US13/64776 dated Jan. 3, 2014.
International Searching Authority, International Search Report and Written Opinion relative to related International Application No. PCT/US16/038714 dated Feb. 21, 2017.
Chiu et al., "Modification of Starches," Starch: Chemistry and Technology, Third Edition, Elsevier Inc., 629-655 (2009).
Hunt et al., "Physicochemical Studies of the Acid Hydrolysis of Corn Starch" 41: 375-385 (Sep. 1964).
Koutlakis, "Starch in General and Starch in Gypsum Board,".
Rogers et al., "Starch refining and modification applications," The RVA Handbook, Crosbie G.B., Ross A.S. eds. AACC—International Press, 63-74 (2007).
TA Instruments Product Brochure, The Discovery Hybrid Rheometer (2016).
Whalen, "Extended Products and Degree of Cook," The RVA Handbook, Crosbie G.B., Ross A.S. eds. AACC—International Press, 75-83 (2007).
International Searching Authority, International Search Report and Written Opinion relative to related International Application No. PCT/US14/057980 dated Feb. 2, 2015.
Examination Report No. 1 for Australian Application No. 2013335106 dated Mar. 7, 2017. (4 pages).
Examination Report No. 2 for Australian Application No. 2013335106 dated Dec. 7, 2017. (4 pages).
Examination Report No. 1 for Australian Application No. 2014329817 dated Dec. 7, 2017. (5 pages).
Examination Report for European Application No. 13783185.5 dated Feb. 25, 2019. (10 pages).
Examination Report for European Application No. 14789654.2 dated Feb. 21, 2020 (5 pages).
First Office Action for Japanese Application No. 2015-537757 dated Jul. 11, 2017. (4 pages, English summary attached).
First Office Action for Japanese Application No. 2016-518449 dated Oct. 9, 2018. (5 pages, English summary attached).
Second Office Action for Japanese Application No. 2015-537757 dated Jan. 9, 2018. (5 pages, English summary attached).

* cited by examiner

METHOD OF PREPARING PREGELATINIZED, PARTIALLY HYDROLYZED STARCH AND RELATED METHODS AND PRODUCTS

CROSS-REFERENCE TO RELATED APPLICATIONS

This patent application is a continuation of copending U.S. patent application Ser. No. 14/494,547, filed Sep. 23, 2014, which is a continuation-in-part of U.S. patent application Ser. No. 14/044,582, filed Oct. 2, 2013, now U.S. Pat. No. 9,540,810, which is a continuation-in-part of copending U.S. patent application Ser. No. 13/835,002, filed Mar. 15, 2013, which claims the benefit of U.S. Provisional Patent Application No. 61/717,588, filed Oct. 23, 2012, all of which preceding patent applications are incorporated herein by reference in their entireties.

BACKGROUND

Starches generally contain two types of polysaccharides (amylose and amylopectin) and are classified as carbohydrates. Some starches are pregelatinized, typically through thermal means. Generally, pregelatinized starches can form dispersions, pastes, or gels with cold water. Pregelatinized starches are generally digestible and have been used in a number of ways, including as an additive to a variety of food products (e.g., in baking, snacks, beverages, confections, dairy, gravies, prepared foods, sauces, and meats) and in pharmaceuticals.

Another use for pregelatinized starches is in the preparation of gypsum wallboard. In this regard, during manufacture of the board, stucco (i.e., calcined gypsum in the form of calcium sulfate hemihydrate and/or calcium sulfate anhydrite), water, starch, and other ingredients as appropriate are mixed, typically in a pin mixer as the term is used in the art. A slurry is formed and discharged from the mixer onto a moving conveyor carrying a cover sheet with one of the skim coats (if present) already applied (often upstream of the mixer). The slurry is spread over the paper (with skim coat optionally included on the paper). Another cover sheet, with or without skim coat, is applied onto the slurry to form the sandwich structure of desired thickness with the aid of, e.g., a forming plate or the like.

The mixture is cast and allowed to harden to form set (i.e., rehydrated) gypsum by reaction of the calcined gypsum with water to form a matrix of crystalline hydrated gypsum (i.e., calcium sulfate dihydrate). It is the desired hydration of the calcined gypsum that enables the formation of the interlocking matrix of set gypsum crystals, thereby imparting strength to the gypsum structure in the product. Heat is required (e.g., in a kiln) to drive off the remaining free (i.e., unreacted) water to yield a dry product.

Often, pregelatinized starches add water demand to the process. To compensate for the water demand and allow for sufficient fluidity during manufacture, water content must be added into the stucco slurry. This excess water creates inefficiencies in the manufacture, including increased drying time, slower manufacturing line speeds, and higher energy costs. The inventors have found that pregelatinized and partially hydrolyzed starch demands less water.

The inventors have also found that techniques for preparing pregelatinized, partially hydrolyzed starches have not been fully satisfactory. Conventional methods for preparing such pregelatinized, partially hydrolyzed starches have not been efficient, with low output and slow production, as well as high energy costs. Thus, there is a need in the art for an improved method of preparing pregelatinized, partially hydrolyzed starch, particularly exhibiting low water demand.

It will be appreciated that this background description has been created by the inventors to aid the reader, and is not to be taken as a reference to prior art nor as an indication that any of the indicated problems were themselves appreciated in the art. While the described principles can, in some regards and embodiments, alleviate the problems inherent in other systems, it will be appreciated that the scope of the protected innovation is defined by the attached claims, and not by the ability of the claimed invention to solve any specific problem noted herein.

SUMMARY

In one aspect, the invention provides a method of making a pregelatinized, partially hydrolyzed starch comprising: (a) mixing at least water, non-pregelatinized starch, and a weak acid that substantially avoids chelating calcium ions to make a wet starch precursor having a moisture content of from about 8 wt. % to about 25 wt. %; (b) feeding the wet starch precursor into an extruder; and (c) pregelatinizing and acid-modifying the wet starch precursor in the extruder at a die temperature of about 150° C. (about 300° F.) to about 210° C. (about 410° F.). The invention also provides a starch produced according to this method.

In another aspect, the invention provides a method of making a pregelatinized, partially hydrolyzed starch comprising: (a) mixing at least water, non-pregelatinized starch, and a strong acid to make a wet starch precursor having a moisture content of from about 8 wt. % to about 25 wt. %, wherein the strong acid is in an amount of about 0.05 wt. % or less by weight of the starch; (b) feeding the wet starch into an extruder; and (c) pregelatinizing and acid-modifying the wet starch precursor in the extruder at a die temperature of about 150° C. (about 300° F.) to about 210° C. (about 410° F.). The invention also provides a starch produced according to this method.

In another aspect, the invention provides a method of making board comprising: (a) forming a pregelatinized, partially hydrolyzed starch by (i) mixing at least water, non-pregelatinized starch, and an acid to form a wet starch precursor having a moisture content of from about 8 wt. % to about 25 wt. %, the acid selected from the group consisting of: (1) a weak acid that substantially avoids chelating calcium ions, (2) a strong acid in an amount of about 0.05 wt. % or less by weight of the starch, or (3) any combination thereof; (ii) feeding the wet starch precursor into an extruder, and (iii) pregelatinizing and acid-modifying the wet starch in the extruder having a die at a temperature of about 150° C. (about 300° F.) to about 210° C. (about 410° F.); (b) mixing the pregelatinized and partially hydrolyzed starch with at least water and stucco to form a slurry; (c) disposing the slurry between a first cover sheet and a second cover sheet to form a wet assembly; (d) cutting the wet assembly into a board; and (e) drying the board. In some embodiments, the set gypsum core has a compressive strength greater than a set gypsum core made with a starch prepared under a different method. In another aspect, the invention provides a board produced according to this method.

DETAILED DESCRIPTION

Figure 1:
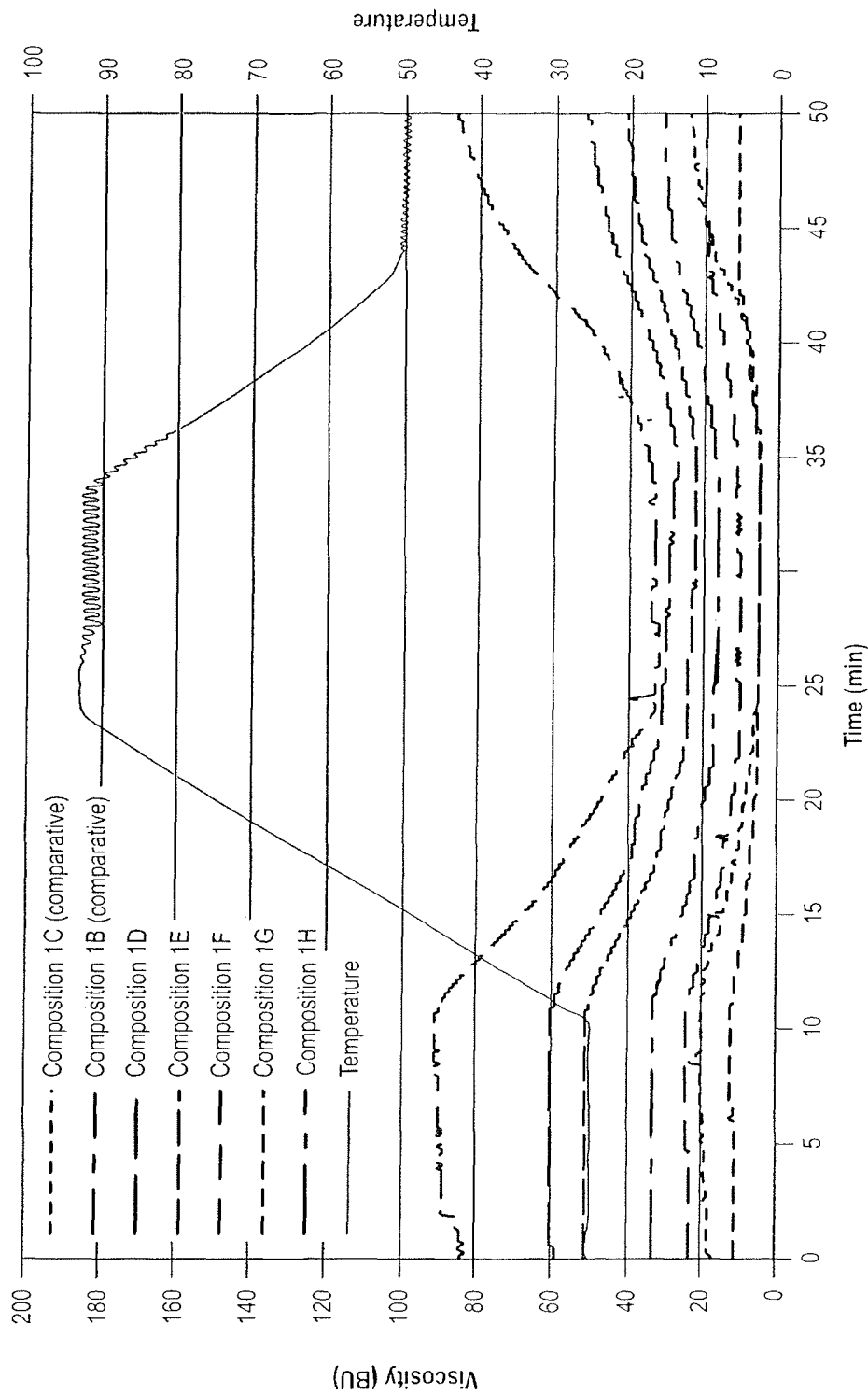
FIG. 1 is an amylogram plotting viscosity (left y-axis) and temperature (right y-axis) versus time (x-axis) that shows pasting profiles of starches extruded at a moisture content of 16 wt. % with the solid content of testing slurry being 10 wt. % as set forth in Example 2.

Embodiments of the invention provide methods of making pregelatinized, partially hydrolyzed starches. In one aspect, the invention provides a method of preparing board (e.g., gypsum wallboard). Pregelatinized, partially hydrolyzed starches produced according to the method of the invention can be used in a variety of other ways, such as in foodstuffs (e.g., in baked goods, beverages, confections, dairy, instant puddings, gravies, soup mixes, prepared foods, pie fillings, sauces, and meats), pharmaceuticals, feeds, adhesives, and colorings. Such starches prepared in accordance with some embodiments of the invention are generally digestible and can provide food products with desired viscosity, and can retain most of the functional properties of the original base material.

Embodiments of the invention are premised, at least in part, on the surprising and unexpected discovery of pregelatinizing and acid-modifying starch in a single step in an extruder. Surprisingly and unexpectedly, pregelatinizing and acid-modifying starch in a single step in an extruder has considerable advantages in comparison to pregelatinizing and acid-modifying starch in separate steps. For example, the inventive method of making pregelatinized, partially hydrolyzed starch allows for a higher output, faster production, and lower energy costs without sacrificing desired properties (e.g., viscosity, fluidity, cold water solubility, etc.) as described herein.

In addition, it has been found that the extrusion conditions (e.g., high temperature and high pressure) can significantly increase the acid hydrolysis rate of starch. Surprisingly and unexpectedly, this single step process makes possible using a weak acid, such as alum, and/or smaller amounts of strong acid, for starch acid-modification. Either acid form provides a mechanism where protons from acids catalyze the hydrolysis of starch. Conventional acid-modification processes include purification and neutralization steps. The use of a weak acid (e.g., alum) and/or a small amount of a strong acid avoids the need for any neutralization step and the subsequent purification step typically required in conventional systems to purify the starch of salts resulting from the neutralization step, in accordance with some embodiments of the invention.

The extrusion process, in accordance with embodiments of the invention, not only pregelatinizes the starch, but also partially hydrolyzes (i.e., via acid-modification) starch molecules. Thus, the extrusion process in one step provides both physical modification (pregelatinization) and chemical modification (acid-modification, partially acid hydrolysis).

The pregelatinization provides the ability for the starch to impart strength (e.g., on a final product such as gypsum board). Acid-modification beneficially partially hydrolyzes the starch to provide the starch with the ability to impart strength on a final product, such as gypsum board, and low water demand in product manufacture, such as in the case of gypsum board manufacturing processes. Thus, the product of methods of preparing starch in accordance with embodiments of the invention is pregelatinized and partially hydrolyzed starch.

In accordance with some embodiments, the invention provides a highly efficient acid-modification reaction. The pregelatinization and acid-modification in the extruder occurs at elevated temperatures and/or pressures as described herein and can result in an acid hydrolysis rate that can be, e.g., approximately 30,000 times or greater faster than conventional acid hydrolysis rates at lower temperatures (e.g., 50° C.) and/or pressures. The rate of acid hydrolysis is further increased through the use of low moisture (about 8 wt. % to about 25 wt. %) levels in the starch precursor and hence through an increased concentration of reactants. Because of this high efficiency of acid-modification, the inventors have found that, surprisingly and unexpectedly, a weak acid or a very low level of strong acid can be used in the starch precursor to achieve optimal acid-modification and avoid the need for neutralization and purification which are costly, time consuming, and inefficient requirements of conventional systems.

In accordance with some embodiments, the hydrolysis is designed to convert the starch into smaller molecules within an optimum size range, which is defined herein by the desired viscosity of the pregelatinized, partially hydrolyzed starch. If the starch is over hydrolyzed, it can be converted into unduly small molecules (e.g., oligosaccharides or sugars), which, in the case of gypsum board, can result in less board strength than that provided by the pregelatinized, partially hydrolyzed starch of desired viscosity.

The pregelatinized, partially hydrolyzed starch can be prepared by (i) mixing at least water, non-pregelatinized starch, and an acid to form a wet starch precursor having a moisture content of from about 8 wt. % to about 25 wt. %. The acid can be: (1) a weak acid that substantially avoids chelating calcium ions, (2) a strong acid in an amount of about 0.05 wt. % or less by weight of the starch, or (3) any combination thereof. The wet starch precursor is pregelatinized and acid-modified in one step in an extruder at an elevated die temperature and/or pressure as described herein. The starch is hydrolyzed to a degree that results in a desired viscosity, e.g., as described herein.

Thus, in some embodiments, a pregelatinized, partially hydrolyzed starch can be made by mixing at least water, non-pregelatinized starch, and a weak acid that substantially avoids chelating calcium ions to make a wet starch precursor having a moisture content of from about 8 wt. % to about 25 wt. %. The wet starch is then fed into an extruder. While in the extruder at a die temperature of about 150° C. (about 300° F.) to about 210° C. (about 410° F.), the wet starch is pregelatinized and acid-modified, such that it is at least partially hydrolyzed.

In further embodiments, a pregelatinized, partially hydrolyzed starch can be made by mixing at least water, non-pregelatinized starch, and a strong acid to make a wet starch precursor having a moisture content of from about 8 wt. % to about 25 wt. %, wherein the strong acid is in an amount of about 0.05 wt. % or less by weight of the starch. The wet starch is then fed into an extruder. While in the extruder at a die temperature of about 150° C. (about 300° F.) to about 210° C. (about 410° F.), the wet starch is pregelatinized and acid-modified, such that it is at least partially hydrolyzed.

Desirably, the resulting pregelatinized, partially hydrolyzed starch has low water demand when included in a stucco slurry and can be useful in the manufacture of board (e.g., gypsum board) with good strength, in some embodiments. Thus, in another aspect, the invention provides a method of making gypsum board using starch prepared with the inventive methods of pregelatinizing and acid-modifying in a single step in an extruder. In some embodiments, the pregelatinized, partially hydrolyzed starches prepared in accordance with embodiments of the invention have low water demand relative to other pregelatinized starches known in the art.

As a result, pregelatinized, partially hydrolyzed starches prepared in accordance with embodiments of the invention can be included in a stucco slurry (e.g., by a feed line into a pin mixer) with good fluidity. In some embodiments, higher amounts of the pregelatinized, partially hydrolyzed starches prepared in accordance with embodiments of the invention can be included since excess water is not needed to be added to the system, such that even higher strengths and lower board densities can be achieved. The resulting board exhibits good strength properties (e.g., having good core hardness, nail pull resistance, compressive strength, etc., or any relationship therebetween, based on any combination of values for each provided herein). Advantageously, inclusion of starch prepared according to the method of the invention during the manufacture of gypsum board enables the production of ultra low density product because of the strength enhancements. The gypsum board can be in the form of, e.g., gypsum wallboard (often referred to as drywall), which can encompass such board used not only for walls but also for ceilings and other locations as understood in the art. However, starch prepared according to the method can have other applications, such as in food products.

Pregelatinization and Acid-Modification

Starches are classified as carbohydrates and contain two types of polysaccharides, namely linear amylose, and branched amylopectin. Starch granules are semi-crystalline, e.g., as seen under polarized light, and are insoluble at room temperatures. Gelatinization is the process by which the starch is placed in water and heated ("cooked"), such that the crystalline structure of the starch granules is melted, and the starch molecules are dissolved in water, resulting in good dispersion. It has been found that, when transforming a starch granule to gelatinized form, initially, the starch granule provides little viscosity in water because starch granules are water insoluble. As the temperature increases, the starch granule swells and the crystalline structure melts at the gelatinization temperature. Peak viscosity is achieved when the starch granule has maximum swelling. Further heating will break the starch granules and dissolve the starch molecules in water, with a precipitous drop-off in viscosity. After cooling, the starch molecule will re-associate to form a 3-D gel structure, with the viscosity increasing due to the gel structure. Some commercial starches are sold in a pregelatinized form, while others are sold in the granular form. In accordance with some embodiments of the present invention, in relation to gypsum board, the granular form undergoes at least some degree of gelatinization. To illustrate, in relation to gypsum board, the starch is pregelatinized prior to its addition to gypsum slurry, also referred to herein as stucco slurry (typically in a mixer, e.g., a pin mixer).

Thus, as used herein, "pregelatinized" means that the starch has any degree of gelatinization, e.g., before it is included in the gypsum slurry or for use in other applications. In some embodiments relating to gypsum board, the pregelatinized starch can be partially gelatinized when included in the slurry, but becomes fully gelatinized when exposed to elevated temperature, e.g., in the kiln during the drying step to remove excess water. In some embodiments relating to gypsum board, the pregelatinized starch is not fully gelatinized, even upon exiting the kiln so long as the starch meets the mid-range viscosity characteristic of some embodiments when under the conditions according to the Viscosity Modifying Admixture (VMA) method.

When viscosity is referred to herein, it is in accordance with the VMA method, unless otherwise indicated. According to this method, viscosity is measured using a Discovery HR-2 Hybrid Rheometer (TA Instruments Ltd) with a concentric cylinder, a standard cup (diameter of 30 mm) with vane geometry (diameter of 28 mm and length of 42.05 mm).

When the starch is obtained, differential scanning calorimetry (DSC) techniques are used to determine whether the starch is fully gelatinized. The DSC step can be utilized to observe whether starch is fully gelatinized, e.g., to confirm that no retrogradation has occurred. One of two procedures is adopted, depending on the temperature required to fully gelatinize the starch, which can also be determined by DSC as one of ordinary skill in the art will appreciate.

Procedure 1 is utilized where the DSC reveals that the starch is fully gelatinized or has a gelatinization temperature at or below 90° C. Procedure 2 is utilized where the gelatinization temperature is above 90° C. Since the viscosity is measured while the starch is in water, procedure 2 uses pressure cooking in a sealed vessel to allow for superheating to temperatures above 100° C. without causing the water to appreciably evaporate. Procedure 1 is reserved for starches already fully gelatinized or for starches having gelatinization temperature up to 90° C., because, as discussed below, the gelatinization takes place in the rheometer which is an open system and cannot create pressurized conditions for gelatinization. Thus procedure 2 is followed for starches having higher gelatinization temperatures. Either way, starch (7.5 g, dry basis) is added into water for a total weight of 50 g when the viscosity is measured.

In procedure 1, the starch is dispersed in the water (15% starch of the total weight of starch and water) and the sample is immediately transferred to a cylinder cell. The cell is covered with aluminum foil. The sample is heated from 25° C. to 90° C. at 5° C./imin and a shear rate of 200 $s^{-1}$. The sample is held at 90° C. for 10 min at a shear rate of 200 $s^{-1}$. The sample is cooled from 90° C. to 80° C. at 5° C./min and a shear rate of 200 $s^{-1}$. The sample is held at 80° C. for 10 min at a shear rate of 0 $s^{-1}$. The viscosity of the sample is measured at 80° C. and a shear rate of 100 $s^{-1}$ for 2 min. The viscosity is the average of the measurement from 30 seconds to 60 seconds.

Procedure 2 is used for starches having gelatinization temperature greater than 90° C. The starch is gelatinized according to the methods well-known in the starch industry (e.g., by pressure cooking). The gelatinized starch water solution (15% of total weight) is immediately transferred into the rheometer measuring cup and equilibrated at 80° C. for 10 minutes. The viscosity of the sample is measured at 80° C. and a shear rate of 100 $s^{-1}$ for 2 minutes. The viscosity is the average of the measurement from 30 seconds to 60 seconds.

Viscograph and DSC are two different methods to describe starch gelatinization. Degree of starch gelatinization can be determined by, for example, thermogram from DSC, e.g., using peak area (melting of crystal) for calculation. A viscogram (from viscograph) is less desirable to determine degree of partial gelatinization but is a good tool to obtain data such as the viscosity change of starch, gelatinization maximum, gelatinization temperature, retrogradation, viscosity during holding, viscosity at the end of cooling, etc. For degree of gelatinization, the DSC measurements are done in the presence of excess water, particularly at or above 67% by weight. If water content of starch/water mixture is less than 67%, gelatinization temperature will increase as water content decreases. It is difficult to melt starch crystals when available water is limited. When water content of starch/water mixture reaches 67%, gelatinization temperature will keep constant no matter how much more water is added into the starch, water mixture. Gelatinization onset temperature indicates the starting temperature of gelatinization. Gelatinization end temperature indicates the end temperature of gelatinization. Enthalpy of gelatinization represents the amount of crystalline structure melted during gelatinization. By using the enthalpy from a starch DSC thermogram, the degree of gelatinization can be indicated.

Different starches have different gelatinization onset temperatures, end temperatures, and gelatinization enthalpies. Therefore, different starches may become fully gelatinized at different temperatures. It will be understood that a starch is fully gelatinized when the starch is heated beyond the end temperature of gelatinization in excess water. In addition, for any particular starch, if the starch is heated below the end temperature of gelatinization, the starch will be partially gelatinized. Thus, partial and not full gelatinization will occur when starch in the presence of excess water is heated below gelatinization end temperature, e.g., as determined by DSC. Full gelatinization will occur when starch in the presence of excess water is heated above gelatinization end temperature, e.g., as determined by DSC. The degree of gelatinization can be adjusted in different ways, such as, for example, by heating the starch below the gelatinization end temperature to form partial gelatinization. For example, if the enthalpy for fully gelatinizing a starch is 4 J/g, when the DSC shows the gelatinization enthalpy of the starch as being only 2 J/g, this means 50% of the starch has been gelatinized. Fully gelatinized starch would not have the DSC thermogram gelatinization peak (enthalpy=0 J/g) when it is measured by DSC.

As noted, the degree of gelatinization can be any suitable amount, such as about 70% or more, etc. However, smaller degrees of gelatinization will more closely approximate granular starch and may not take full advantage of the strength enhancement, better (more complete) dispersion, and/or water demand reduction of some embodiments of the invention. Thus, in some embodiments, it is preferred that there is a higher degree of gelatinization, e.g., at least about 75%, at least about 80%, at least about 85%, at least about 90%, at least about 95%, at least about 97%, at least about 99%, or full (100%) gelatinization. Starch with lower degree of gelatinization can be added to slurry with additional gelatinization (e.g., to 100%) taking place in the kiln in the case of gypsum board. For purposes of addition to slurry, by "fully gelatinized," it will be understood that the starch is sufficiently cooked at or above its gelatinization temperature or to otherwise achieve full gelatinization as can be seen from DSC techniques. Although some small degree of retrogradation upon cooling may be expected, the starch will still be understood as "fully gelatinized" for addition to gypsum slurry, or for use in other applications, in some embodiments as one of ordinary skill in the art will recognize. In contrast, for purposes of the VMA method discussed herein, such retrogradation is not accepted in making the viscosity measurement.

The starch molecule can be acid-modified, e.g., to hydrolyze glycosidic bonds between glucose units to achieve desired molecular weight. One benefit of acid-modifying starch such that a reduction in molecular weight is achieved is that the water demand will decrease. Conventional pregelatinized starches that were not also acid-modified had a very high water demand, which is associated with higher energy costs. It has been conventionally believed that it is generally preferred that the modification take place before gelatinization because it tends to be more efficient and less cost intensive. Surprisingly and unexpectedly, however, the inventors have found that pregelatinization and acid-modification can be incorporated into a single step, such that they can occur simultaneously rather than in series.

Method of Preparing Starch

In accordance with some embodiments of the invention, prior to entry into the extruder, a wet starch precursor is prepared. The wet starch precursor can be prepared by any suitable method. For example, in some embodiments, the wet starch precursor is prepared by adding to a starch raw material water and an acid that is (a) a weak acid that substantially avoids chelating calcium ions, and/or (b) a strong acid in a small amount.

Any suitable starch raw material can be selected to prepare the wet starch precursor so long as it can be used to make pregelatinized, partially hydrolyzed starch, such as one meeting the mid-range viscosity characteristic of some embodiments of the invention. As used herein, "starch" refers to a composition that includes a starch component. As such, the starch can be 100% pure starch or may have other components such as those commonly found in flours such as protein and fiber, so long as the starch component makes up at least about 75% by weight of the starch composition. The starch can be in the form of a flour (e.g., corn flour) containing starch, such as flour having at least about 75% starch by weight of the flour, e.g., at least about 80%, at least about 85%, at least about 90%, at least about 95%, etc.). Any suitable unmodified starch or flour can be used to prepare the precursor of the pregelatinized, partially hydrolyzed starches of the invention. For example, the starch can be CCM260 yellow corn meal, CCF600 yellow corn flour (Bunge North America), Clinton 106 (ADM), and/or Midsol 50 (MGP Ingredients).

The wet starch precursor can be prepared to have any suitable moisture content, such that desired levels of pregelatinization and acid-modification are achieved in an extruder. In some embodiments, for example, it is desirable that the wet starch precursor have a moisture content of from about 8 wt. % to about 25 wt. % by weight of the total starch precursor, such as from about 8 wt. % to about 23 wt. %, e.g., from about 8 wt. % to about 21 wt. %, from about 8 wt. % to about 20 wt. %, from about 8 wt. % to about 19 wt. %, from about 8 wt. % to about 18 wt. %, from about 8 wt. % to about 17 wt. %, from about 8 wt. % to about 16 wt. %, from about 8 wt. % to about 15 wt. %, from about 9 wt. % to about 25 wt. %, from about 9 wt. % to about 23 wt. %, from about 9 wt. % to about 21 wt. %, from about 9 wt. % to about 20 wt. %, from about 9 wt. % to about 19 wt. %, from about 9 wt. % to about 18 wt. %, from about 9 wt. % to about 17 wt. %, from about 9 wt. % to about 16 wt. %, from about 9 wt. % to about 15 wt. %, from about 10 wt. % to about 25 wt. %, from about 10 wt. % to about 23 wt. %, from about 10 wt. % to about 21 wt. %, from about 10 wt. % to about 20 wt. %, from about 10 wt. % to about 19 wt. %, from about 10 wt. % to about 18 wt. %, from about 10 wt. % to about 17 wt. %, from about 10 wt. % to about 16 wt. %, from about 10 wt. % to about 15 wt. %, from about 11 wt. % to about 25 wt. %, from about 11 wt. % to about 23 wt. %, from about 11 wt. % to about 21 wt. %, from about 11 wt. % to about 20 wt. %, from about 11 wt. % to about 19 wt. %, from about 11 wt. % to about 18 wt. %, from about 11 wt. % to about 17 wt. %, from about 11 wt. % to about 16 wt. %, from about 11 wt. % to about 15 wt. %, from about 12 wt. % to about 25 wt. %, from about 12 wt. % to about 23 wt. %, from about 12 wt. % to about 21 wt. %, from about 12 wt. % to about 20 wt. %, from about 12 wt. % to about 19 wt. %, from about 12 wt. % to about 18 wt. %, from about 12 wt. % to about 17 wt. %, from about 12 wt. % to about 16 wt. %, from about 12 wt. % to about 15 wt. %, from about 13 wt. % to about 25 wt. %, from about 13 wt. % to about 23 wt. %, from about 13 wt. % to about 21 wt. %, from about 13 wt. % to about 20 wt. %, from about 13 wt. % to about 19 wt. %, from about 13 wt. % to about 18 wt. %, from about 13 wt. % to about 17 wt. %, from about 13 wt. % to about 16 wt. %, from about 13 wt. % to about 15 wt. %, from about 14 wt. % to about 25 wt. %, from about 14 wt. % to about 23 wt. %, from about 14 wt. % to about 21 wt. %, from about 14 wt. % to about 20 wt. %, from about 14 wt. % to about 19 wt. %, from about 14 wt. % to about 18 wt. %, from about 14 wt. % to about 17 wt. %, from about 14 wt. % to about 16 wt. %, or from about 14 wt. % to about 15 wt. % all based on the total weight of the wet starch precursor. It will be understood that when preparing the wet starch, the moisture contents described herein include ambient moisture as well as water added.

While not wishing to be bound by any particular theory, it is believed that a lower moisture content leads to greater friction in the extruder. In some embodiments, the wet starch can be prepared to have a moisture content that allows for sufficient mechanical energy input when the wet starch is fed through the extruder, such that friction prevents the wet starch from moving through the extruder too easily. The increased friction can increase the disruption of hydrogen bonding in the starch.

Any suitable weak acid that substantially avoids chelating calcium ions may be mixed into the wet starch. Without wishing to be bound by any particular theory, chelation includes the weak acid, for example, forming a coordination complex with calcium or otherwise interfering with the formation of gypsum crystals within the gypsum slurry. Such interference may be the reduction in number of gypsum crystals formed, retardation (decreased rate) of formation of the crystals, decreasing interactions among the gypsum crystals, etc. The term "substantially" with respect to not chelating calcium ions generally means that at least 90% (e.g., at least 92%, at least 95%, at least 96%, at least 97%, at least 98%, or at least 99%) of the available calcium ions are not chelated to the acid.

Weak acids in accordance with embodiments of the invention can be defined as those having a pKa value from about 1 to about 6, e.g., from about 1 to about 5, from about 1 to 4, from about 1 to 3, from about 1 to 2, from about 1.2 to about 6, from about 1.2 to about 5, from about 1.2 to about 4, from about 1.2 to about 3, from about 1.2 to about 2, from about 2 to about 6, from about 2 to about 5, from about 2 to about 4, from about 2 to about 3, from about 3 to about 6, from about 3 to about 5, from about 3 to about 4, from about 4 to about 6, or from about 4 to about 5. As is understood in the art, the pKa value is a measure of the strength of an acid; the lower the pKa value, the stronger the acid.

Weak acids that substantially avoid chelating calcium ions are characterized, for example, by a lack of multi-binding sites, such as multiple carboxyl functional groups (COO—), which tend to bind calcium ions. In some embodiments, the weak acid has a minimal amount of multi-binding sites, such as multi-COO— groups, or is substantially free of multi-binding sites, such as multi-COO— groups, such that, for example, chelation is minimal (i.e., substantially avoided) or gypsum crystal formation is not substantially impacted relative to the crystal formation in the absence of the weak acid. In some embodiments, for example, aluminum sulfate (alum) is an appropriate weak acid to use in preparing the wet starch since it substantially avoids chelating calcium ions. Alum does not have multi-binding sites.

In some embodiments, alum is added into the wet starch precursor in any suitable form, such as in liquid containing alum of desired solids content. For example, the liquid alum can be included in an aqueous solution where the alum is present in any suitable amount. Other weak acids can be added similarly.

The wet starch can be mixed to include any suitable amount of a weak acid that substantially avoids chelating calcium ions, such that the pregelatinized, partially hydrolyzed starch is prepared with desired viscosity and low water demand and is not over hydrolyzed into sugar. For example, in some embodiments, such weak acid is included in an amount of from about 0.5 wt. % to about 5 wt. % based on the weight of the starch, such as from about 0.5 wt. % to about 4.5 wt. %, e.g., from about 0.5 wt. % to about 4 wt. %, from about 0.5 wt. % to about 3.5 wt. %, from about 0.5 wt. % to about 3 wt. %, from about 1 wt. % to about 5 wt. %, from about 1 wt. % to about 4.5 wt. %, from about 1 wt. % to about 4 wt. %, from about 1 wt. % to about 3.5 wt. %, from about 1 wt. % to about 3 wt. %, from about 1.5 wt. % to about 5 wt. %, from about 1.5 wt. % to about 4.5 wt. %, from about 1.5 wt. % to about 4 wt. %, from about 1.5 wt. % to about 3.5 wt. %, from about 1.5 wt. % to about 3 wt. %, from about 2 wt. % to about 5 wt. %, from about 2 wt. % to about 4.5 wt. %, from about 2 wt. % to about 4 wt. %, from about 2 wt. % to about 3.5 wt. %, from about 2 wt. % to about 3 wt. %, from about 2.5 wt. % to about 5 wt. %, from about 2.5 wt. % to about 4.5 wt. %, from about 2.5 wt. % to about 4 wt. %, from about 2.5 wt. % to about 3.5 wt. %, or from about 2.5 wt. % to about 3 wt. %. It will be understood that these amounts encompass the weak acid component, and, when the weak acid is in a solution, excludes the water or other components of the solution.

The wet starch precursor can be prepared to optionally further comprise secondary acids that can chelate calcium ion, such as tartaric acid. Thus, in some embodiments, a secondary acid, such as tartaric acid, can be combined with any suitable weak acid that does not chelate calcium ions. Tartaric acid is known to retard gypsum crystallization. However, in combination with the non-chelating weak acid, tartaric acid avoids substantial retarding of gypsum crystallization, such that the hydrolysis reaction via acid-modification is optimized. Besides tartaric acid, other secondary acids, such as succinic acid or malic acid, may be beneficial so long as they do not surpass the accelerating effect of alum. In some embodiments, the wet starch precursor includes both alum and tartaric acid.

If included, secondary acids (e.g., tartaric acid) can be present in any suitable amount. For example, tartaric acid can be present in an amount of from about 0.1 wt. % to about 0.6 wt. % based on the weight of the starch, e.g., from about 0.1 wt. % to about 0.4 wt. %, from about 0.2 wt. % to about 0.3 wt. %.

In some embodiments, oil can optionally be added to the wet starch to improve the conveyability of starch inside the extruder. Possible oils include canola oil, vegetable oil, corn oil, soybean oil, or any combination thereof, in some embodiments. For example, in some embodiments, canola oil or one of the aforementioned substitutes can optionally be added in an amount of from about 0 wt. % to about 0.25 wt. % by weight of the starch, e.g., from about 0.1 wt. % to about 0.2 wt. %, from about 0.1 wt. % to about 0.15 wt. %, from about 0.15 wt. % to about 0.25 wt. %, from about 0.15 wt. % to about 0.2 wt. %, or from about 0.2 wt % to about 0.25 wt. %.

In accordance with some embodiments, the wet starch precursor is prepared by mixing water, non-pregelatinized starch, and a small amount of a strong acid. In some embodiments, the strong acid has a pKa of about −1.7 or less. Any such strong acid can be used and, in some embodiments, the strong acid comprises sulfuric acid, nitric acid, hydrochloric acid, or any combination thereof. Sulfuric acid, alone or in combination with other acids, is preferred in some embodiments because sulfate ion can accelerate gypsum crystallization in gypsum board embodiments.

The amount of strong acid is relatively small, such as about 0.05 wt. % or less by weight of the starch, e.g., about 0.045 wt. % or less, about 0.04 wt. % or less, about 0.035 wt. % or less, about 0.03 wt. % or less, about 0.025 wt. % or less, about 0.02 wt. % or less, about 0.015 wt. % or less, about 0.01 wt. % or less, about 0.005 wt. % or less, about 0.001 wt. % or less, about 0.0005 wt. % or less, such as from about 0.0001 wt. % to about 0.05 wt. %, from about 0.0001 wt. % to about 0.045 wt. %, from about 0.0001 wt. % to about 0.04 wt. %, from about 0.0001 wt. % to about 0.035 wt. %, from about 0.0001 wt. % to about 0.03 wt. %, from about 0.0001 wt. % to about 0.025 wt. %, from about from about 0.0001 wt. % to about 0.02 wt. %, from about 0.0001 wt. % to about 0.015 wt. %, from about 0.0001 wt. % to about 0.01 wt. %, from about 0.0001 wt. % to about 0.005 wt. %, from about 0.0001 wt. % to about 0.001 wt. %, from about 0.0001 wt. % to about 0.0005 wt. % by weight of the starch. It will be understood that these amounts encompass the strong acid component, and, when the strong acid is in a solution, excludes the water or other components of the solution. For example, conventional strong acid-modification uses 2% sulfuric acid solution, with starch solid of ~35% (2 g sulfuric acid for 35 g starch). The percent is based on pure sulfuric acid components. It is calculated as the weight of sulfuric acid component divided by the weight of the wet starch. For example, if the sulfuric acid is 50% pure (which means that half the weight of the solution is pure sulfuric acid), then the weight of the sulfuric acid solution is doubled. To illustrate, for 100 g starch, 0.1 g pure sulfuric acid is added to achieve 0.1 wt. %. If the concentration of sulfuric solution is 50%, 0.2 g of the 50% sulfuric acid solution is added to achieve 0.1 wt. %.

It will be understood that there are different grades of acids (>95%, 98%, 99.99%). These differences are encompassed by the term "about" in relation to the amount of strong acid in the starch precursor. One of ordinary skill in the art will readily be able to determine the wt. % described herein to include the different grades. The amounts of strong acid used in accordance with some embodiments of the invention are considerably smaller than what were included in conventional systems which used, e.g., at least about 2 g of sulfuric acid for 35 g of starch. In some embodiments, the strong acid in small amounts as described above can be used in combination with a weak acid that does not chelate calcium ions, such as alum, as described herein.

Embodiments of the invention provide feeding the wet starch precursor through an extruder, such that the wet starch precursor is pregelatinized and acid-modified in a single step in the extruder. It will be appreciated that an extruder is a machine generally used to melt and process polymers into a desired shape by melting the polymer and pumping it through a die. The extruder can also mix the polymer with other ingredients, such as color, reinforcing fibers, mineral fillers, etc. The purpose of the extruder is to disperse and distribute all of the ingredients fed into it and to melt the ingredients with a constant temperature and pressure.

Configurations and arrangements for extruders are known in the art. In general, an extruder comprises a feed hopper to deliver the feed material, a preconditioner comprising heat jackets for conditioning polymer with plasticizer (e.g., water), an extruder modular head comprising heating zones, and a die assembly. Extruders generally include a feed auger, a knife, and screw(s). The feed auger is present to help convey the wet starch precursor into the extruder. The knife is present to cut the string-like pregelatinized, partially hydrolyzed starch into small pellets, such that they can be ground. The screw(s) help mix the wet starch precursor, convey the wet starch precursor through the extruder, and provide mechanical shearing. An extruder can be of the single-screw or twin-screw varieties as will be understood by one of ordinary skill in the art. See, e.g., Leszek Moscicki, *Extrusion-Cooking Techniques*, WILEY-VCH Verlag & Co. KGaA, 2011.

In single-screw extruders, the screw generally comprises a feed section with deep channels for transporting the solids from the throat of the feeder and compressing them, a compression section at which point the screw's channels become progressively less deep and the polymer is melted, and a metering section with shallow channels that conveys the melted polymer to the die. Some screws are designed to include mixing devices (e.g., pins extending from the screw).

Twin-screw extruders generally have two screws that rotate either in the same direction (i.e., co-rotating) or in opposite directions (i.e., counter-rotating). The two screws may rotate with non-intermeshing or fully intermeshing flights. Whereas in the case of single-screw extruders, the material being fed fills the entire screw channel, in the case of twin-screw extruders, only part of the screw channel is filled, such that downstream feedports or vents can be utilized for the addition of certain ingredients.

The die assembly generally comprises a plate, spacer, and die head. When extruding materials, the process can be either continuous, such that the material is extruded in an indefinite length, or semi-continuous, such that the material is extruded in pieces. Materials being extruded may be hot or cold.

The invention provides a method of preparing pregelatinized, partially hydrolyzed starch in an extruder. Any suitable extruder can be used, such as a single-screw extruder (e.g., the Advantage 50 available from American Extrusion International, located in South Beloit, Ill.) or a twin-screw extruder (e.g., the Wenger TX52 available from Wenger located in Sabetha, Kans.).

As described herein, non-pregelatinized starch, an acid in the form of a weak acid that substantially avoids chelating calcium ions and/or a strong acid in a small amount, and water are mixed and fed into the extruder. In some embodiments, additional water may be added to the extruder. While in the extruder, a combination of heating elements and mechanical shearing melts and pregelatinizes the starch, the weak acid partially hydrolyzes the starch to a desired molecular weight indicated by viscosity as desirable as described herein. The conditions in the extruder, because of the mechanical energy, will also cause the starch molecules to degrade, which partially produces the same effect of acid-modification. It is believed that because the conditions in an extruder (e.g., high reaction temperature and high pressure) in accordance with some embodiments facilitate this chemical reaction, a weak acid and/or low amounts of a strong acid can be used. The inventive method, thus, improves the efficiency of starch acid-modification.

The main screw(s) can be operated at any suitable speed, such that desired mixing and mechanical shearing are achieved. For example, in some embodiments the main screw can be operated at a speed of about 350 RPM (± about 100 RPM). The feed auger can be operated at any suitable speed to achieve desired feeding rate. For example, in some embodiments the feed auger can be operated at a speed of about 14 RPM (± about 5 RPM).

The knife can be operated at any suitable speed. For example, in various embodiments the knife can be operated at a speed of from about 400 RPM to about 1,000 RPM, e.g., from about 400 RPM to about 900 RPM, from about 400 RPM to about 800 RPM, from about 400 RPM to about 700 RPM, from about 400 RPM to about 600 RPM, from about 400 RPM to about 500 RPM, from about 500 RPM to about 1,000 RPM, from about 500 RPM to about 900 RPM, from about 500 RPM to about 800 RPM, from about 500 RPM to about 700 RPM, from about 500 RPM to about 600 RPM, from about 600 RPM to about 1,000 RPM, from about 600 RPM to about 900 RPM, from about 600 RPM to about 800 RPM, from about 600 RPM to about 700 RPM, from about 700 RPM to about 1,000 RPM, from about 700 RPM to about 900 RPM, from about 700 RPM to about 800 RPM, from about 800 RPM to about 1,000 RPM, from about 800 RPM to about 900 RPM, or from about 900 RPM to about 1,000 RPM.

The wet starch can be pregelatinized and acid-modified in an extruder having a die at any suitable temperature, such that the wet starch becomes sufficiently pregelatinized without burning the materials. For example, the wet starch can be pregelatinized and acid-modified in an extruder having a die at a temperature of from about 150° C. (about 300° F.) to about 210° C. (about 410° F.), e.g., in various embodiments, from about 150° C. to about 205° C. (about 400° F.), from about 150° C. to about 199° C. (about 390° F.), from about 150° C. to about 193° C. (about 380° F.), from about 150° C. to about 188° C. (about 370° F.), from about 150° C. to about 182° C.: (about 360° F.), from about 154° C. (about 310° F.) to about 210° C., from about 154° C. to about 205° C. (about 400° F.), from about 154° C. to about 199° C., from about 154° C. to about 193° C., from about 154° C. to about 188° C., from about 154° C. to about 182° C., from about 160° C. (about 320° F.) to about 210° C., from about 160° C. to about 205° C. (about 400° F.), from about 160° C. to about 199° C., from about 160° C. to about 193° C., from about 160° C. to about 188° C., from about 160° C. to about 182° C., from about 166° C. (about 330° F.) to about 210° C., from about 166° (to about 205° C., from about 166° (to about 199° C., from about 166° C. to about 193° C., from about 166° (C to about 188° (C, from about 166° C. to about 182° C., from about 171° C. (about 340° F.) to about 210° C., from about 171° C. to about 205° C., from about 171° C. to about 199° C., from about 171° C. to about 193° C., from about 171° C. to about 188° C., from about 171° C. to about 182° C., from about 177° C. (about 350° F.) to about 210° C., from about 177° C. to about 205° C., from about 177° C. to about 199° C., from about 177° C. to about 193θ(C, from about 177° C. to about 188° C., or from about 177° C. to about 182° C. While the die of the extruder can be any sufficient temperature as described herein, the die temperature generally exceeds the melting temperature of the starch crystals.

The degree of gelatinization can be any suitable amount, such as at least about 70% or more. e.g., at least about 75%, at least about 80%, at least about 85%, at least about 90%, at least about 95%, at least about 97%, at least about 99%, or full (100%) gelatinization. In the case of making wallboard as described below, starch with such lower degrees of gelatinization can be added to stucco slurry. e.g., with additional gelatinization (for example, to 100%) taking place in the kiln.

The pressure in the extruder can be at any suitable level, such that appropriate conditions for pregelatinization and acid-modification are achieved. Pressure inside the extruder is determined by the raw material being extruded, moisture content, die temperature, and screw speed, which will be recognized by one of ordinary skill in the art. For example, the pressure in the extruder can be at least about 2,000 psi (about 13,800 kPa), such as at least about 2,250 psi (about 15,500 kPa), at least about 2,500 psi (about 17,200 kPa), at least about 2,750 psi (about 19,000 kPa), at least about 3,000 psi (about 20,650 kPa), at least about 3,500 psi (about 24,100 kPa), at least about 4,000 psi (about 27,600 kPa), or at least about 4,500 psi (about 31,000 kPa). In some embodiments, the pressure can be from about 2,000 psi to about 5,000 psi (34,500 kPa), e.g., from about 2,000 psi to about 4,500 psi, from about 2,000 psi to about 4,000 psi, from about 2,000 psi to about 3,500 psi, from about 2,000 psi to about 3,000 psi, from about 2,000 psi to about 2,500 psi, from about 2,500 psi to about 5,000 psi, from about 2,500 psi to about 4,500 psi, from about 2,500 psi to about 4,000 psi, from about 2,500 psi to about 3,500 psi, from about 2,500 psi to about 3,000 psi, from about 3,000 psi to about 5,000 psi, from about 3,000 psi to about 4,500 psi, from about 3,000 psi to about 4.000 psi, from about 3,000 psi to about 3,500 psi, from about 3,500 psi to about 5,000 psi, from about 4,000 psi to about 5,000 psi, from about 4,000 psi to about 4,500 psi, or from about 4,500 psi to about 5,000 psi.

Surprisingly and unexpectedly, it has been found that the inventive method of preparing pregelatinized, partially hydrolyzed starch in a single step in an extruder is considerably faster than pregelatinizing and acid-modifying starch in two steps in series. Significantly greater amounts of pregelatinized, partially hydrolyzed starch can be prepared with the inventive method than starch prepared with any other method. The higher production amount and faster output rate are because of high reaction rate at high temperature and/or high pressure. In some embodiments, pregelatinization and acid-modification occur in less than about 5 minutes, such as less than about 4 minutes. e.g., less than about 3 minutes, less than about 2 minutes, less than about 90 seconds, less than about 75 seconds, less than about 1 minute, less than about 45 seconds, less than about 30 seconds, less than about 25 seconds, less than about 20 seconds, less than about 15 seconds, or less than about 10 seconds. In addition, in some embodiments, the pregelatinization and acid-modification occur at a rate in the extruder bound by any two of the foregoing points. For example, the pregelatinization and acid-modification rate can be between about 10 seconds and 5 minutes, e.g., between about 10 seconds and about 4 minutes, between about 10 seconds and about 3 minutes, between about 10 seconds and about 2 minutes, between about 10 seconds and about 90 seconds, between about 10 seconds and about 75 seconds, between about 10 seconds and about 1 minute, between about 10 seconds and about 45 seconds, between about 10 seconds and about 30 seconds, between about 10 seconds and about 25 seconds, between about 10 seconds and about 20 seconds, or between about 10 seconds and about 15 seconds.

The inventive method of preparing pregelatinized, partially hydrolyzed starch can be a continuous process occurring at any sufficient rate. In some embodiments, starch is pregelatinized and acid-modified at a production output rate in an extruder of at least about 100 kg/hr, such as at least about 150 kg/hr, at least about 200 kg/hr, at least about 250 kg/hr, at least about 300 kg/hr, at least about 350 kg/hr, at least about 400 kg/hr, at least about 450 kg/hr, 500 kg/hr, at least about 550 kg/hr, e.g., at least about 600 kg/hr, at least about 650 kg/hr, at least about 700 kg/hr, at least about 750 kg/hr, at least about 800 kg/hr, at least about 850 kg/hr, at least about 900 kg/hr, at least about 950 kg/hr, at least about 1,000 kg/hr, at least about 1,050 kg/hr, at least about 1,100 kg/hr, at least about 1,150 kg/hr, at least about 1,200 kg/hr, at least about 1,250 kg/hr, at least about 1,300 kg/hr, at least about 1,350 kg/hr, at least about 1,400 kg/hr, at least about 1,450 kg/hr, or at least about 1,500 kg/hr. In addition, in some embodiments, the production output rate in an extruder can be bound by any two of the foregoing points. For example, the production output rate can be between about 100 kg/hr and about 1,500 kg/hr (e.g., between about 100 kg/hr and about 1,500 kg/hr, between about 100 kg/hr and 1,000 kg/hr, between about 250 kg/hr and about 1,500 kg/hr, between about 250 kg/hr and about 1,000 kg/hr, between about 600 kg/hr and about 1,250 kg/hr, between about 650 kg/hr and about 1,200 kg/hr, between about 700 kg/hr and about 1,100 kg/hr, between about 750 kg/hr and about 1,000 kg/hr, etc.).

It has been found by the inventors that in some embodiments the conditions in an extruder (e.g., high temperature and high pressure) are particularly conducive to efficiently and sufficiently pregelatinizing and acid-modifying starch in a single step. When the extruder mixes the wet starch, it creates very high friction, thereby generating heat. The shear force is created by the screw in the extruder because the space between the screw and chamber in the extruder is very small. Specific mechanical energy (SME) describes mechanical energy of an object per unit of mass. SME will depend on the moisture content. Higher moisture content (e.g., for purposes of fluidity) will result in low viscosity and low friction and, thus, a smaller SME. If more moisture is present, a smaller SME will result because of low viscosity and low friction. The moisture contents in the wet starch precursor of the invention as described herein provide effective SME.

In the extruder, because of the conditions provided by embodiments of the invention as described herein, the starch is pregelatinized highly efficiently. While not wishing to be bound by any particular theory, it is believed that the good mixing in the extruder in accordance with some embodiments of the invention requires less water for reaction in an extruder. Very low moisture content facilitates a high concentration of reactant, which can accelerate the chemical reaction rate. The high temperature of the extruder also significantly accelerates the reaction rate. When the starch leaves the extruder, the reaction has occurred, such that it is pregelatinized and partially hydrolyzed.

In conventional acid-modification, starch is added into a strong acid solution. This conventional method uses significantly more water and acid than the surprising and unexpected method of simultaneously pregelatinizing and acid-modifying starch in one step in an extruder as described herein rather than in series. Conventional acid-modification takes several hours. After the reaction has taken place, the acid needs to be neutralized, purified, and washed away. The neutralization and purification steps are time consuming and costly.

Until the inventors' surprising and unexpected discovery, it was thought undesirable to use a weak acid that substantially avoids chelating calcium ions or a strong acid in a small amount in conventional acid-modification. This is because, in the conventional method, the weaker the acid is or the smaller the amount of a strong acid is, the longer acid-modification takes. Thus, a strong acid (e.g., having a pKa of below about −1.7) in high amounts was desired in conventional acid-modification. Surprisingly and unexpectedly, when pregelatinized, partially hydrolyzed starch is prepared in an extruder according to embodiments of the invention using a weak acid or a strong acid in a small amount as described herein, there is no need for neutralization and purification steps, due to the mild acidic condition and less interference with gypsum crystallization, respectively. In some embodiments, there can still be acid present in the pregelatinized, partially hydrolyzed starch.

Properties of Starch and Advantages of Using the Starch in Gypsum Board

The starch prepared in an extruder in accordance with embodiments of the invention can be any pregelatinized, partially hydrolyzed starch. In some embodiments, the starch can be prepared to have various properties as desired (e.g., mid-range viscosity, cold water solubility, cold water viscosity, etc.) as described herein.

Pregelatinized, partially hydrolyzed starches prepared in an extruder in accordance with embodiments of the invention can be suitable for use in gypsum board. For application in gypsum board, for instance, pregelatinization and acid-modification are beneficial, e.g., for strength purposes by achieving a desired viscosity (and, hence, molecular weight range) in accordance with embodiments of the invention as described herein. In the method of making wallboard discussed herein, the starch that is introduced into the stucco slurry can be at least about 70% gelatinized, e.g., at least about 75% gelatinized, at least about 80% gelatinized, at least about 85% gelatinized, at least about 90% gelatinized, at least about 95% gelatinized, at least about 97% gelatinized, or 100% gelatinized (i.e., fully gelatinized).

Furthermore, feeding a wet starch comprising a weak acid that substantially avoids chelating calcium ions as described herein into an extruder, in accordance with embodiments of the invention, hydrolyzes the starch, such that a desired viscosity is achieved, thus indicating a desired molecular weight range is achieved. Viscosity thereby indicates the molecular weight of the pregelatinized, partially hydrolyzed starch, as will be appreciated by one of ordinary skill in the art.

In some embodiments, pregelatinized, partially hydrolyzed starch prepared in accordance with embodiments of the invention can be prepared to have any suitable viscosity. In some embodiments, the viscosity is characterized as having a "mid-range" viscosity (i.e., having a viscosity from about 20 centipoise to about 700 centipoise) when the pregelatinized, partially hydrolyzed starch is subjected to conditions according to the VMA method with the pregelatinized, partially hydrolyzed starch in water in an amount of 15% by weight of the total weight of the pregelatinized, partially hydrolyzed starch and water. Thus, the VMA method is used to determine whether the pregelatinized, partially hydrolyzed starch exhibits the mid-range viscosity characteristic when subjected to the conditions of the VMA method. This does not mean that the pregelatinized, partially hydrolyzed starch must be added to the gypsum slurry under these conditions. Rather, when adding the pregelatinized, partially hydrolyzed starch to slurry, it can be in wet (in various concentrations of starch in the water) or dry forms, and it need not be fully gelatinized as described herein or otherwise under the conditions set forth in the VMA method.

In some embodiments, the mid-range viscosity of the pregelatinized starch can be from about 20 centipoise to about 700 centipoise, such as from about 20 centipoise to about 500 centipoise, from about 30 centipoise to about 200 centipoise, or from about 100 centipoise to about 700 centipoise. In embodiments of the invention, the viscosity of the pregelatinized starch when tested under the VMA method can be, e.g., as listed in Tables 1A, 1B and 1C below. In the tables, an "X" represents the range "from about [corresponding value in top row] to about [corresponding value in left-most column]." The indicated values represent viscosity of the pregelatinized starch in centipoise. For ease of presentation, it will be understood that each value represents "about" that value. For example, the first "X" in Table 1A is the range "about 20 centipoise to about 25 centipoise."

TABLE 1A

| | | Starting Point for Viscosity Range (centipoise) | | | | | | | | | | |
|---|---|---|---|---|---|---|---|---|---|---|---|---|
| | | 20 | 25 | 30 | 35 | 40 | 45 | 50 | 55 | 60 | 65 | 70 | 75 |
| End Point for Viscosity Range (centipoise) | 25 | X | | | | | | | | | | | |
| | 30 | X | X | | | | | | | | | | |
| | 35 | X | X | X | | | | | | | | | |
| | 40 | X | X | X | X | | | | | | | | |
| | 45 | X | X | X | X | X | | | | | | | |
| | 50 | X | X | X | X | X | X | | | | | | |
| | 55 | X | X | X | X | X | X | X | | | | | |
| | 60 | X | X | X | X | X | X | X | X | | | | |
| | 65 | X | X | X | X | X | X | X | X | X | | | |
| | 70 | X | X | X | X | X | X | X | X | X | X | | |
| | 75 | X | X | X | X | X | X | X | X | X | X | X | |
| | 100 | X | X | X | X | X | X | X | X | X | X | X | X |
| | 125 | X | X | X | X | X | X | X | X | X | X | X | X |
| | 150 | X | X | X | X | X | X | X | X | X | X | X | X |
| | 175 | X | X | X | X | X | X | X | X | X | X | X | X |
| | 200 | X | X | X | X | X | X | X | X | X | X | X | X |
| | 225 | X | X | X | X | X | X | X | X | X | X | X | X |
| | 250 | X | X | X | X | X | X | X | X | X | X | X | X |
| | 275 | X | X | X | X | X | X | X | X | X | X | X | X |
| | 300 | X | X | X | X | X | X | X | X | X | X | X | X |
| | 325 | X | X | X | X | X | X | X | X | X | X | X | X |
| | 350 | X | X | X | X | X | X | X | X | X | X | X | X |
| | 375 | X | X | X | X | X | X | X | X | X | X | X | X |
| | 400 | X | X | X | X | X | X | X | X | X | X | X | X |
| | 425 | X | X | X | X | X | X | X | X | X | X | X | X |
| | 450 | X | X | X | X | X | X | X | X | X | X | X | X |
| | 475 | X | X | X | X | X | X | X | X | X | X | X | X |
| | 500 | X | X | X | X | X | X | X | X | X | X | X | X |
| | 525 | X | X | X | X | X | X | X | X | X | X | X | X |
| | 550 | X | X | X | X | X | X | X | X | X | X | X | X |
| | 575 | X | X | X | X | X | X | X | X | X | X | X | X |
| | 600 | X | X | X | X | X | X | X | X | X | X | X | X |
| | 625 | X | X | X | X | X | X | X | X | X | X | X | X |
| | 650 | X | X | X | X | X | X | X | X | X | X | X | X |
| | 675 | X | X | X | X | X | X | X | X | X | X | X | X |
| | 700 | X | X | X | X | X | X | X | X | X | X | X | X |

TABLE 1B

| | | Starting Point for Viscosity Range (centipoise) | | | | | | | | | | | |
|---|---|---|---|---|---|---|---|---|---|---|---|---|---|
| | | 100 | 125 | 150 | 175 | 200 | 225 | 250 | 275 | 300 | 325 | 350 | 375 |
| End Point for Viscosity Range (centipoise) | 125 | X | | | | | | | | | | | |
| | 150 | X | X | | | | | | | | | | |
| | 175 | X | X | X | | | | | | | | | |
| | 200 | X | X | X | X | | | | | | | | |
| | 225 | X | X | X | X | X | | | | | | | |
| | 250 | X | X | X | X | X | X | | | | | | |
| | 275 | X | X | X | X | X | X | X | | | | | |
| | 300 | X | X | X | X | X | X | X | X | | | | |
| | 325 | X | X | X | X | X | X | X | X | X | | | |
| | 350 | X | X | X | X | X | X | X | X | X | X | | |
| | 375 | X | X | X | X | X | X | X | X | X | X | X | |

TABLE 1B-continued

| | | Starting Point for Viscosity Range (centipoise) | | | | | | | | | | | |
|---|---|---|---|---|---|---|---|---|---|---|---|---|
| | | 100 | 125 | 150 | 175 | 200 | 225 | 250 | 275 | 300 | 325 | 350 | 375 |
| | 400 | X | X | X | X | X | X | X | X | X | X | X | X |
| | 425 | X | X | X | X | X | X | X | X | X | X | X | X |
| | 450 | X | X | X | X | X | X | X | X | X | X | X | X |
| | 475 | X | X | X | X | X | X | X | X | X | X | X | X |
| | 500 | X | X | X | X | X | X | X | X | X | X | X | X |
| | 525 | X | X | X | X | X | X | X | X | X | X | X | X |
| | 550 | X | X | X | X | X | X | X | X | X | X | X | X |
| | 575 | X | X | X | X | X | X | X | X | X | X | X | X |
| | 600 | X | X | X | X | X | X | X | X | X | X | X | X |
| | 625 | X | X | X | X | X | X | X | X | X | X | X | X |
| | 650 | X | X | X | X | X | X | X | X | X | X | X | X |
| | 675 | X | X | X | X | X | X | X | X | X | X | X | X |
| | 700 | X | X | X | X | X | X | X | X | X | X | X | X |

TABLE 1C

| | | Starting Point for Viscosity Range (centipoise) | | | | | | | | | | | |
|---|---|---|---|---|---|---|---|---|---|---|---|---|
| | | 400 | 425 | 450 | 475 | 500 | 525 | 550 | 575 | 600 | 625 | 650 | 675 |
| End Point | 425 | X | | | | | | | | | | | |
| for | 450 | X | X | | | | | | | | | | |
| Viscosity | 475 | X | X | X | | | | | | | | | |
| Range | 500 | X | X | X | X | | | | | | | | |
| (centipoise) | 525 | X | X | X | X | X | | | | | | | |
| | 550 | X | X | X | X | X | X | | | | | | |
| | 575 | X | X | X | X | X | X | X | | | | | |
| | 600 | X | X | X | X | X | X | X | X | | | | |
| | 625 | X | X | X | X | X | X | X | X | X | | | |
| | 650 | X | X | X | X | X | X | X | X | X | X | | |
| | 675 | X | X | X | X | X | X | X | X | X | X | X | |
| | 700 | X | X | X | X | X | X | X | X | X | X | X | X |

Thus, the viscosity of the pregelatinized, partially hydrolyzed starch prepared in accordance with embodiments of the invention can have a range between and including any of the aforementioned endpoints set forth in Tables 1A, 1B or 1C. Alternatively, in some embodiments, the pregelatinized, partially hydrolyzed starch has a viscosity (10% solids, 93° C.) of from about 5 Brabender Units (BU) to about 33 BU, measured according to the Brabender method described herein, e.g., from about 10 BU to about 30 BU, from about 12 BU to about 25 BU, or from about 15 BU to about 20 BU.

In some embodiments, pregelatinized, partially hydrolyzed starches prepared in accordance with embodiments of the invention can provide significant benefits to the strength of the product (e.g., wallboard) to which they are applied. Since starch contains glucose monomers containing three hydroxyl groups, starch provides many sites for hydrogen bonding to gypsum crystals. While not wishing to be bound by any particular theory, it is believed that the molecular size of pregelatinized, partially hydrolyzed starch prepared in accordance with embodiments of the invention allows for optimal mobility of starch molecules to align starch molecules with the gypsum crystals to facilitate good binding of starch to gypsum crystals to strengthen the resulting crystalline gypsum matrix. e.g., via hydrogen bonding.

Conventional pregelatinized starches prepared according to another method than that which is described herein, e.g., having viscosities outside the mid-range, which would have either longer chain lengths and higher molecular weight (viscosity that is too high) and shorter chain lengths and lower molecular weights (viscosity that is too low), respectively, do not provide the same combination of benefits. It is also believed that, with respect to starch efficiency, when the starch molecules sufficiently bind to the gypsum crystals, additional starch does not add significant benefit because the crystals are already bound such that there is no further gypsum crystal sites for which the starch to adhere or bind. Accordingly, because of the optimal binding between gypsum crystals and the molecules of pregelatinized, partially hydrolyzed starch prepared in accordance with embodiments of the invention, the strength of the crystalline gypsum matrix is enhanced, and less starch is required to promote that strength compared with conventional starches. The inventors have found dissolved starch molecules with, for example, mid-range viscosity (representing mid range molecular weight of starch) allows for optimal mobility of starch molecules to align starch molecules with gypsum crystals to facilitate good starch and gypsum hydrogen-bonding and core strength in some embodiments.

Pregelatinized, partially hydrolyzed starch prepared in accordance with some embodiments of the invention also provides advantages with respect to water demand, in some embodiments. Adding conventional pregelatinized starch to gypsum slurry requires that additional water be added to the gypsum slurry in order to maintain a desired degree of slurry fluidity. This is because conventional pregelatinized starch increases the viscosity and reduces the fluidity of the gypsum slurry. Thus, the use of pregelatinized starch in conventional systems has resulted in an increase in water demand such that even more excess water would be required in the gypsum slurry.

Surprisingly and unexpectedly, pregelatinized, partially hydrolyzed starch prepared in accordance with embodiments of the invention, particularly with the desired mid-range viscosity, demands less water so that the effect on water demand in the gypsum slurry is reduced, especially in comparison to conventional starches. Furthermore, because of the efficiency of the pregelatinized, partially hydrolyzed starch prepared in accordance with embodiments of the invention, such that less starch can be used, the positive impact on water demand can be even more significant in accordance with some embodiments of the invention. This lower water demand provides considerable efficiencies during manufacture. For example, excess water requires energy input for drying. The speed of the line must be slowed to accommodate the drying. Thus, by reducing the water load in the gypsum slurry, less energy resources and cost can be seen, as well as faster production rates. In some embodiments, the increase in water demand in a gypsum slurry is less than the increase in water demand required by other starches such as pregelatinized starches having viscosity above 700 centipoise (e.g., about 773 centipoise), e.g., prepared by a different method.

Any suitable non-pregelatinized starch can be selected in preparing a pregelatinized, partially hydrolyzed starch so long as it is sufficient to be pregelatinized and acid-modified in an extruder. As used herein, "starch" refers to a composition that includes a starch component. As such, the starch can be 100% pure starch or may have other components such as those commonly found in flours such as protein and fiber, so long as the starch component makes up at least about 75% by weight of the starch composition. The starch can be in the form of a flour (e.g., corn flour) containing starch, such as flour having at least about 75% starch by weight of the flour, e.g., at least about 80%, at least about 85%, at least about 90%, at least about 95%, etc.). By way of example, and not in any limitation, the starch can be in the form of a corn flour containing starch.

In some embodiments, the pregelatinized, partially hydrolyzed starch prepared in accordance with embodiments of the invention can be prepared to have desired cold water solubility. Conventional pregelatinization techniques involve making starch cold water soluble and generally require cooking starch in an excess amount of water. However, these conventional techniques are not efficient. Extrusion, in accordance with embodiments of the invention, which allows for a combination of heating and mechanical shearing, is surprisingly and unexpectedly an energy efficient method that can be used to produce pregelatinized, partially hydrolyzed starch in a one step process having a low moisture content with cold water solubility. Cold water solubility is defined as having any amount of solubility in water at room temperature (about 25° C.). It was discovered that starches exhibiting solubility in cold water can provide significant benefits to the strength of gypsum products (e.g., wallboard). Cold water soluble starches of the present invention have a cold water solubility greater than about 30% and, when added to a set gypsum core, can increase the strength of the gypsum core. The solubility of the pregelatinized starch in water is defined as the amount of starch that dissolves in room temperature water divided by the total amount of starch.

In some embodiments, the cold water solubility of the pregelatinized, partially hydrolyzed starch prepared in accordance with embodiments of the invention is from about 30% to about 100%. In other embodiments, the cold water solubility of the extruded pregelatinized, partially hydrolyzed starch is from about 50% to about 100%. In embodiments of the invention, the cold water solubility of the extruded pregelatinized, partially hydrolyzed starch can be, e.g., as listed in Table 2. In the table, an "X" represents the range "from about [corresponding value in top row] to about [corresponding value in left-most column]." The indicated values represent the cold water solubility of a extruded pregelatinized, partially hydrolyzed starch prepared in accordance with embodiments of the invention (Table 2). For ease of presentation, it will be understood that each value represents "about" that value. For example, the first "X" in Table 2 is the range "from about 30% to about 35%." The ranges of the table are between and including the starting and endpoints.

TABLE 2

|  |  | Starting Point for Cold Water Solubility Range (%) | | | | | | | | | | | | |
| --- | --- | --- | --- | --- | --- | --- | --- | --- | --- | --- | --- | --- | --- | --- |
|  |  | 30 | 35 | 40 | 45 | 50 | 55 | 60 | 65 | 70 | 75 | 80 | 85 | 90 | 95 |
| End Point | 35 | X | | | | | | | | | | | | | |
| for | 40 | X | X | | | | | | | | | | | | |
| Cold Water | 45 | X | X | X | | | | | | | | | | | |
| Solubility | 50 | X | X | X | X | | | | | | | | | | |
| Range (%) | 55 | X | X | X | X | X | | | | | | | | | |
|  | 60 | X | X | X | X | X | X | | | | | | | | |
|  | 65 | X | X | X | X | X | X | X | | | | | | | |
|  | 70 | X | X | X | X | X | X | X | X | | | | | | |
|  | 75 | X | X | X | X | X | X | X | X | X | | | | | |
|  | 80 | X | X | X | X | X | X | X | X | X | X | | | | |
|  | 85 | X | X | X | X | X | X | X | X | X | X | X | | | |
|  | 90 | X | X | X | X | X | X | X | X | X | X | X | X | | |
|  | 95 | X | X | X | X | X | X | X | X | X | X | X | X | X | |
|  | 100 | X | X | X | X | X | X | X | X | X | X | X | X | X | X |

While not wishing to be bound by any particular theory, it is believed that a combination of mechanical and thermal energy during extrusion is responsible for the cold water solubility of the pregelatinized, partially hydrolyzed starch prepared in accordance with embodiments of the invention. It is believed that when the starch undergoes extrusion, the hydrogen bonds between the starch molecules are broken. When the extruded starch is dissolved in water, the starch forms hydrogen bonds with the water molecules. After the pregelatinization process, the extruded pregelatinized, partially hydrolyzed starch molecules are free to hydrogen-bond with the gypsum crystals, thus imparting higher strength to the gypsum product. Accordingly, because starches exhibiting solubility in cold water improves the strength of gypsum wallboard, less starch is required compared with conventional starches.

In some embodiments, the pregelatinized, partially hydrolyzed starch has a cold water viscosity (10% solids, 25° C.) of from about 10 BU to about 120 BU, measured according to the Brabender method described herein, e.g., from about 20 BU to about 110 BU, from about 30 BU to about 100 BU, from about 40 BU to about 90) BU, from about 50 BU to about 80 BU, or from about 60 BU to about 70 BU.

Use of Starch Prepared According to the Method in Making Board

In some embodiments, a board (e.g., gypsum wallboard) can be made by forming a pregelatinized, partially hydrolyzed starch by) mixing at least water, non-pregelatinized starch, and an acid to form a wet starch precursor having a moisture content of from about 8 wt. % to about 25 wt. %, the acid selected from: a weak acid that substantially avoids chelating calcium ions, a strong acid in an amount of about 0.01 wt. % or less by weight of the starch, or any combination thereof.

The wet starch precursor is then fed into an extruder in which the temperature of the die of about 150° C. (about 300° F.) to about 210° C. (about 410° F.) where the wet starch is pregelatinized and acid-modified, such that it is at least partially hydrolyzed. The preglelatinized, partially hydrolyzed starch can then be mixed with at least water and stucco to form a slurry, which can then be disposed between a first cover sheet and a second cover sheet to form a wet assembly. The wet assembly can then be cut into a board, which is then dried. Preferably, the set gypsum core of the board has a compressive strength greater than a set gypsum core made with a starch prepared under a different method.

The pregelatinized, partially hydrolyzed starch prepared in accordance with embodiments of the invention surprisingly and unexpectedly can be included in the slurry in a relatively low amount (solids/solids basis) and still achieve significant strength enhancement in the board. Accordingly, the pregelatinized, partially hydrolyzed starch prepared in accordance with embodiments of the invention can be included in the gypsum slurry in an amount that is from about 0.1% to about 10% by weight based on the weight of the stucco, e.g., from about 0.5% to about 10%.

It has been found that increasing the amount of the pregelatinized, partially hydrolyzed starch prepared in accordance with embodiments of the invention in the slurry beyond these ranges does not improve strength as efficiently since strength levels can somewhat plateau upon addition of even more starch in some embodiments. However, higher starch quantities can be utilized if desired especially where the diminishing return on strength is accepted.

In embodiments of the invention, pregelatinized, partially hydrolyzed starch can be added to the gypsum slurry in an amount, for example, as listed in Tables 3A and 3B below. In the table, an "X" represents the range "from about [corresponding value in top row] to about [corresponding value in left-most column]." The indicated values represent the amount of starch as a percentage by weight of the stucco. For ease of presentation, it will be understood that each value represents "about" that value. For example, the first "X" is the range "from about 0.1% of the starch by weight of the stucco, to about 0.25% of the starch by weight of the stucco."

TABLE 3A

|      | 0.1 | 0.25 | 0.5 | 0.75 | 1.0 | 1.25 | 1.5 | 1.75 | 2.0 | 2.25 | 2.5 | 2.75 | 3.0 | 3.5 |
|------|-----|------|-----|------|-----|------|-----|------|-----|------|-----|------|-----|-----|
| 0.25 | X   |      |     |      |     |      |     |      |     |      |     |      |     |     |
| 0.5  | X   | X    |     |      |     |      |     |      |     |      |     |      |     |     |
| 0.75 | X   | X    | X   |      |     |      |     |      |     |      |     |      |     |     |
| 1.0  | X   | X    | X   | X    |     |      |     |      |     |      |     |      |     |     |
| 1.25 | X   | X    | X   | X    | X   |      |     |      |     |      |     |      |     |     |
| 1.5  | X   | X    | X   | X    | X   | X    |     |      |     |      |     |      |     |     |
| 1.75 | X   | X    | X   | X    | X   | X    | X   |      |     |      |     |      |     |     |
| 2.0  | X   | X    | X   | X    | X   | X    | X   | X    |     |      |     |      |     |     |
| 2.25 | X   | X    | X   | X    | X   | X    | X   | X    | X   |      |     |      |     |     |
| 2.5  | X   | X    | X   | X    | X   | X    | X   | X    | X   | X    |     |      |     |     |
| 2.75 | X   | X    | X   | X    | X   | X    | X   | X    | X   | X    | X   |      |     |     |
| 3.0  | X   | X    | X   | X    | X   | X    | X   | X    | X   | X    | X   | X    |     |     |
| 3.5  | X   | X    | X   | X    | X   | X    | X   | X    | X   | X    | X   | X    | X   |     |
| 4.0  | X   | X    | X   | X    | X   | X    | X   | X    | X   | X    | X   | X    | X   | X   |
| 4.5  | X   | X    | X   | X    | X   | X    | X   | X    | X   | X    | X   | X    | X   | X   |
| 5.0  | X   | X    | X   | X    | X   | X    | X   | X    | X   | X    | X   | X    | X   | X   |
| 5.5  | X   | X    | X   | X    | X   | X    | X   | X    | X   | X    | X   | X    | X   | X   |
| 6.0  | X   | X    | X   | X    | X   | X    | X   | X    | X   | X    | X   | X    | X   | X   |
| 6.5  | X   | X    | X   | X    | X   | X    | X   | X    | X   | X    | X   | X    | X   | X   |
| 7.0  | X   | X    | X   | X    | X   | X    | X   | X    | X   | X    | X   | X    | X   | X   |
| 7.5  | X   | X    | X   | X    | X   | X    | X   | X    | X   | X    | X   | X    | X   | X   |
| 8.0  | X   | X    | X   | X    | X   | X    | X   | X    | X   | X    | X   | X    | X   | X   |
| 8.5  | X   | X    | X   | X    | X   | X    | X   | X    | X   | X    | X   | X    | X   | X   |
| 9.0  | X   | X    | X   | X    | X   | X    | X   | X    | X   | X    | X   | X    | X   | X   |
| 9.5  | X   | X    | X   | X    | X   | X    | X   | X    | X   | X    | X   | X    | X   | X   |
| 10.0 | X   | X    | X   | X    | X   | X    | X   | X    | X   | X    | X   | X    | X   | X   |

TABLE 3B

|      | 4.0 | 4.5 | 5.0 | 5.5 | 6.0 | 6.5 | 7.0 | 7.5 | 8.0 | 8.5 | 9.0 | 9.5 |
|------|-----|-----|-----|-----|-----|-----|-----|-----|-----|-----|-----|-----|
| 4.5  | X   |     |     |     |     |     |     |     |     |     |     |     |
| 5.0  | X   | X   |     |     |     |     |     |     |     |     |     |     |
| 5.5  | X   | X   | X   |     |     |     |     |     |     |     |     |     |
| 6.0  | X   | X   | X   | X   |     |     |     |     |     |     |     |     |
| 6.5  | X   | X   | X   | X   | X   |     |     |     |     |     |     |     |
| 7.0  | X   | X   | X   | X   | X   | X   |     |     |     |     |     |     |
| 7.5  | X   | X   | X   | X   | X   | X   | X   |     |     |     |     |     |
| 8.0  | X   | X   | X   | X   | X   | X   | X   | X   |     |     |     |     |
| 8.5  | X   | X   | X   | X   | X   | X   | X   | X   | X   |     |     |     |
| 9.0  | X   | X   | X   | X   | X   | X   | X   | X   | X   | X   |     |     |
| 9.5  | X   | X   | X   | X   | X   | X   | X   | X   | X   | X   | X   |     |
| 10.0 | X   | X   | X   | X   | X   | X   | X   | X   | X   | X   | X   | X   |

Thus, the amount of the pregelatinized, partially hydrolyzed starch prepared in accordance with embodiments of the invention added to the slurry can have a range between and including any of the aforementioned endpoints set forth in Tables 3A or 3B.

Pregelatinized, partially hydrolyzed starch prepared in accordance with embodiments of the invention can be added to the slurry in combination with other starches, in some embodiments for various applications. For example, in the case of gypsum wallboard as described below, pregelatinized, partially hydrolyzed starch prepared in accordance with embodiments of the invention can be combined with other starches to enhance both core strength and paper-core bond, particularly if some increase in water demand is accepted.

Thus, in some embodiments of the invention, gypsum slurry may include one or more pregelatinized, partially hydrolyzed starch prepared in accordance with embodiments of the invention, as well as one or more other types of starches. Other starches can include, for example, pregelatinized starches having viscosity below 20 centipoise and/or above 700 centipoise. One example is pregelatintzed corn starch (e.g., having a viscosity over 700 centipoise such as about 773 centipoise). The other starches may also be in the form of, e.g., non-pregelatinized starches, such as acid-modified starches, as well as alkylated starches, e.g., ethylated starches, that are not gelatinized, etc. The combination of starches may be pre-mixed (e.g., in a dry mix, optionally with other components such as stucco, etc., or in a wet mix with other wet ingredients) before addition to the gypsum slurry, or they can be included in the gypsum slurry one at a time, or any variation thereof. Any suitable proportion of pregelatinized, partially hydrolyzed starch prepared in accordance with embodiments of the invention and other starch may be included.

For example, the starch content of pregelatinized, partially hydrolyzed starch prepared in accordance with embodiments of the invention as a percentage of total starch content to be added to gypsum slurry can be, e.g., at least about 10% by weight, such as at least about 20%, at least about 30%, at least about 40%, at least about 50%, at least about 60%, at least about 70%, at least about 80%, at least about 90%, at least about 95%, at least about 99%, at least about 100%, or any range in between). In some embodiments, the ratio of pregelatinized, partially hydrolyzed starch prepared in accordance with embodiments of the invention to other starch can be about 25:75, about 30:70, about 35:65, about 50:50, about 65:35, about 70:30, about 75:25, etc.

In addition to the starch component, the slurry is formulated to include water, stucco, foaming agent (sometimes referred to simply as "foam"), and other additives as desired, in some embodiments. Surprisingly and unexpectedly, in accordance with some embodiments, particularly those exhibiting a mid-range viscosity, it has been found that the amount of water needed to be added to maintain the slurry fluidity at the same level it would be without the pregelatinized, partially hydrolyzed starch prepared in an extruder in accordance with embodiments of the invention, is less than the increase in the amount of water needed when using a starch prepared according to a different method. The stucco can be in the form of calcium sulfate alpha hemihydrate, calcium sulfate beta hemihydrate, and/or calcium sulfate anhydrite. The stucco can be fibrous or non-fibrous. Foaming agent can be included to form an air void distribution within the continuous crystalline matrix of set gypsum. In some embodiments, the foaming agent comprises a major weight portion of unstable component, and a minor weight portion of stable component (e.g., where unstable and blend of stable/unstable are combined). The weight ratio of unstable component to stable component is effective to form an air void distribution within the set gypsum core. See, e.g., U.S. Pat. Nos. 5,643,510; 6,342,284; and 6,632,550.

It has been found that suitable void distribution and wall thickness (independently) can be effective to enhance strength, especially in lower density board (e.g., below about 35 pct). See, e.g., US 2007/0048490 and US 2008/0090068. Evaporative water voids, generally having voids of about 5 µm or less in diameter, also contribute to the total void distribution along with the aforementioned air (foam) voids. In some embodiments, the volume ratio of voids with a pore size greater than about 5 microns to the voids with a pore size of about 5 microns or less, is from about 0.5:1 to about 9:1, such as, for example, from about 0.7:1 to about 9:1, from about 0.8:1 to about 9:1, from about 1.4:1 to about 9:1, from about 1.8:1 to about 9:1, from about 2.3:1 to about 9:1, from about 0.7:1 to about 6:1, from about 1.4:1 to about 6:1, from about 1.8:1 to about 6:1, from about 0.7:1 to about 4:1, from about 1.4:1 to about 4:1, from about 1.8:1 to about 4:1, from about 0.5:1 to about 2.3:1, from about 0.7:1 to about 2.3:1, from about 0.8:1 to about 2.3:1, from about 1.4:1 to about 2.3:1, from about 1.8:1 to about 2.3:1, etc. In some embodiments, the foaming agent is present in the slurry, e.g., in an amount of less than about 0.5% by weight of the stucco such as about 0.01% to about 0.5%, about 0.01% to about 0.4%, about 0.01% to about 0.3%, about 0.01% to about 0.2%, about 0.01% to about 0.1%, about 0.02% to about 0.4%, about 0.02% to about 0.3%, about 0.02% to about 0.2%, etc., all by weight of the stucco.

Additives such as accelerator (e.g., wet gypsum accelerator, heat resistant accelerator, climate stabilized accelerator) and retarder are well known and can be included, in some embodiments. See, e.g., U.S. Pat. Nos. 3,573,947 and 6,409,825. In some embodiments where accelerator and/or retarder are included, the accelerator and/or retarder each can be in the gypsum slurry in an amount on a solid basis of, e.g., from about 0% to about 10% by weight of the stucco (e.g., about 0.1% to about 10%), such as, for example, from about 0% to about 5% by weight of the stucco (e.g., about 0.1% to about 5%). Other additives as desired may be included, e.g., to impart strength to enable lower weight product with sufficient strength, to avoid permanent deformation, to promote green strength, for example, as the product is setting on the conveyor traveling down a manufacturing line, to promote fire resistance, to promote water resistance, etc.

For example, the slurry can optionally include at least one dispersant to enhance fluidity in some embodiments. Like the pregelatinized, partially hydrolyzed starch prepared in accordance with embodiments of the invention and other ingredients, the dispersants may be included in a dry form with other dry ingredients and/or in a liquid form with other liquid ingredients in the core slurry. Examples of dispersants include naphthalenesulfonates, such as polynaphthalenesulfonic acid and its salts (polynaphthalenesulfonates) and derivatives, which are condensation products of naphthalenesulfonic acids and formaldehyde; as well as polycarboxylate dispersants, such as polycarboxylic ethers, for example, PCE211, PCE111, 1641, 1641F, or PCE 2641-Type Dispersants, e.g., MELFLUX 2641F, MELFLUX 2651F, MELFLUX 1641F, MELFLUX 2500L dispersants (BASF), and COATEX Ethacryl M, available from Coatex, Inc.; and/or lignosulfonates or sulfonated lignin. Lignosulfonates are water-soluble anionic polyelectrolyte polymers, byproducts from the production of wood pulp using sulfite pulping. One example of a lignin useful in the practice of principles of embodiments of the present invention is Marasperse C-21 available from Reed Lignin Inc.

Lower molecular weight dispersants are generally preferred. Lower molecular weight naphthalenesulfonate dispersants are favored because they trend to a lower water demand than the higher viscosity, higher molecular weight dispersants. Thus, molecular weights from about 3,000 to about 10,000 (e.g., about 8,000 to about 10,000) are preferred. As another illustration, for PCE211 type dispersants, in some embodiments, the molecular weight can be from about 20,000 to about 60,000, which exhibit less retardation than dispersants having molecular weight above 60,000.

One example of a naphthalenesulfonate is DILOFLO, available from GEO Specialty Chemicals. DILOFLO is a 45% naphthalenesulfonate solution in water, although other aqueous solutions, for example, in the range of about 35% to about 55% by weight solids content, are also readily available. Naphthalenesulfonates can be used in dry solid or powder form, such as LOMAR D, available from GEO Specialty Chemicals, for example. Another exemplary naphthalenesulfonate is DAXAD, available from Hampshire Chemical Corp.

If included, the dispersant can be included in any suitable (solids/solids) amount, such as, for example, from about 0.1% to about 5% by weight based on the weight of the stucco, e.g., from about 0.1% to about 4%, from about 0.1% to about 3%, from about 0.2% to about 3%, from about 0.5% to about 3%, from about 0.5% to about 2.5%, from about 0.5% to about 2%, from about 0.5% to about 1.5%, etc.

In some embodiments, one or more phosphate-containing compounds can also be optionally included in the slurry, if desired. For example, phosphate-containing components useful in some embodiments include water-soluble components and can be in the form of an ion, a salt, or an acid, namely, condensed phosphoric acids, each of which comprises two or more phosphoric acid units: salts or ions of condensed phosphates, each of which comprises two or more phosphate units; and monobasic salts or monovalent ions of orthophosphates as well as water-soluble acyclic polyphosphate salt. See, e.g., U.S. Pat. Nos. 6,342,284; 6,632,550; 6,815,049; and 6,822,033.

Phosphate compositions if added in some embodiments can enhance green strength, resistance to permanent deformation (e.g., sag), dimensional stability, etc. Trimetaphosphate compounds can be used, including, for example, sodium trimetaphosphate, potassium trimetaphosphate, lithium trimetaphosphate, and ammonium trimetaphosphate. Sodium trimetaphosphate (STMP) is preferred, although other phosphates may be suitable, including for example sodium tetrametaphosphate, sodium hexametaphosphate having from about 6 to about 27 repeating phosphate units and having the molecular formula $Na_{n+2}P_nO_{3n+1}$ wherein n=6-27, tetrapotassium pyrophosphate having the molecular formula $K_4P_2O_7$, trisodium dipotassium tripolyphosphate having the molecular formula $Na_3K_2P_3O_{10}$, sodium tripolyphosphate having the molecular formula $Na_5P_3O_{10}$, tetrasodium pyrophosphate having the molecular formula $Na_4P_2O_7$, aluminum trimetaphosphate having the molecular formula $Al(PO_3)_3$, sodium acid pyrophosphate having the molecular formula $Na_2H_2P_2O_7$, ammonium polyphosphate having 1,000-3,000 repeating phosphate units and having the molecular formula $(NH_4)_{n+2}PnO_{3n+1}$ wherein n=1,000-3,000, or polyphosphoric acid having two or more repeating phosphoric acid units and having the molecular formula $H_{n+2}P_nO_{3n+1}$ wherein n is two or more.

The phosphate can be included in some embodiments in a dry form or in a form in water (e.g., a phosphate solution from about 5% to about 20%, such as about a 10% solution). If included, the phosphate can be in any suitable amount (solids/solids basis), such as from about 0.01% to about 0.5% by weight based on the weight of stucco, e.g., from about 0.03% to about 0.4%, from about 0.1% to about 0.3%, or from about 0.12% to about 0.4% by weight based on the weight of stucco.

Suitable additives for fire-rated and/or water resistant product can also optionally be included, including e.g., siloxanes (water resistance); fiber; heat sink additives such as aluminum trihydrite (ATH), magnesium hydroxide or the like; and/or high expansion particles (e.g., expandable to about 300% or more of original volume when heated for about one hour at 1560° F.). See, e.g., co-pending, commonly assigned U.S. application Ser. No. 13/400,010 (filed Feb. 17, 2012) for description of these and other ingredients. In some embodiments, high expansion vermiculite is included, although other fire resistant materials can be included. The board of some fire-related product according to the invention can have a Thermal Insulation Index (TI) of about 17 minutes or greater, e.g., about 20 minutes or greater, about 30 minutes or greater, about 45 minutes or greater, about 60 minutes or greater, etc.; and/or a High Temperature Shrinkage (at temperatures of about 1560° F. (850° C.)) of less than about 10% in the x-y directions and expansion in the z-direction of greater than about 20%. The fire or water resistance additives can be included in any suitable amount as desired depending, e.g., on fire rating, etc. For example, if included, the fire or water resistance additives can be in an amount from about 0.5% to about 10% by weight of the stucco, such as from about 1% to about 10%, about 1% to about 8%, about 2% to about 10%, about 2% to about 8% by weight of the stucco, etc.

If included, in some embodiments, the siloxane preferably is added in the form of an emulsion. The slurry is then shaped and dried under conditions which promote the polymerization of the siloxane to form a highly cross-linked silicone resin. A catalyst which promotes the polymerization of the siloxane to form a highly cross-linked silicone resin can be added to the gypsum slurry. In some embodiments, solventless methyl hydrogen siloxane fluid sold under the name SILRES BS 94 by Wacker-Chemie GmbH (Munich, Germany) can be used as the siloxane. This product is a siloxane fluid containing no water or solvents. It is contemplated that about 0.3% to about 1.0% of the BS 94 siloxane may be used in some embodiments, based on the weight of the dry ingredients. For example, in some embodiments, it is preferred to use from about 0.4% to about 0.8% of the siloxane based on the dry stucco weight.

The slurry formulation can be made with any suitable water/stucco ratio, e.g., from about 0.4 to about 1.3. However, because the pregelatinized, partially hydrolyzed starches prepared in accordance with embodiments of the invention reduce the amount of water required to be added to the slurry to accommodate them, as compared with other starches (e.g., conventional pregelatinized starch prepared according to a different method), the slurry can be formulated with a water/stucco ratio input that is lower in some embodiments than what is conventional for other starch-containing gypsum slurries, especially at low weight/density. For example, in some embodiments, the water/stucco ratio can be from about 0.4 to about 1.1, from about 0.4 to about 0.9, from about 0.4 to about 0.85, from about 0.45 to about 0.85, from about 0.55 to about 0.85, from about 0.55 to about 0.8, from about 0.6 to about 0.9, from about 0.6 to about 0.85, from about 0.6 to about 0.8, etc.

The cover sheets can be formed of any suitable material and basis weight. Advantageously, board core formed from slurry comprising pregelatinized, partially hydrolyzed starch prepared in accordance with embodiments of the invention provides sufficient strength in board even with lower basis weight cover sheets such as, for example, less than 45 lbs/MSF (e.g., about 33 lbs/MSF to 45 lbs/MSF) even for lower weight board (e.g., having a density of about 35 pcf or below) in some embodiments. However, if desired, in some embodiments, heavier basis weights can be used, e.g., to further enhance nail pull resistance or to enhance handling, e.g., to facilitate desirable "feel" characteristics for end-users.

In some embodiments, to enhance strength (e.g., nail pull strength), especially for lower density board, one or both of the cover sheets can be formed from paper and have a basis weight of, for example, at least about 45 lbs/MSF (e.g., from about 45 lbs/MSF to about 65 lbs/MSF, from about 45 lbs/MSF to about 60 lbs/MSF, from about 45 lbs/MSF to about 55 lbs/MSF, from about 50 lbs/MSF to about 65 lbs/MSF, from about 50 lbs/MSF to about 60 lbs/MSF, etc.). If desired, in some embodiments, one cover sheet (e.g., the "face" paper side when installed) can have aforementioned higher basis weight, e.g., to enhance nail pull resistance and handling, while the other cover sheet (e.g., the "back" sheet when the board is installed) can have somewhat lower weight basis if desired (e.g., weight basis of less than about 45 lbs/MSF, e.g., from about 33 lbs/MSF to about 45 lbs/MSF or from about 33 lbs/MSF to about 40 lbs/MSF).

Board weight is a function of thickness. Since boards are commonly made at varying thicknesses, board density is used herein as a measure of board weight. The advantages of the pregelatinized, partially hydrolyzed starch prepared in accordance with embodiments of the invention can be seen across various board densities, e.g., about 40 pcf or less, such as from about 20 pcf to about 40 pcf, from about 24 pcf to about 37 pcf, etc. However, preferred embodiments of the invention have particular utility at lower densities where the enhanced strength provided by the pregelatinized, partially hydrolyzed starch prepared in accordance with embodiments of the invention advantageously enables the use of lower weight board with good strength and lower water demand than board made from other starches prepared according to a different method.

For example, in some embodiments, board density can be from about 20 pcf to about 35 pcf, e.g., from about 20 pcf to about 34 pcf, from about 20 pcf to about 33 pcf, from about 20 pcf to about 32 pcf, from about 20 pcf to about 31 pcf, from about 20 pcf to about 30 pcf, from about 20 pcf to about 29 pcf, from about 21 pcf to about 35 pcf, from about 21 pcf to about 34 pet, from about 21 pcf to about 33 pcf, from about 21 pcf to about 32 pcf, from about 21 pcf to about 31 pcf, from about 21 pcf to about 30 pcf, from about 21 pcf to about 29 pcf, from about 24 pcf to about 35 pcf, from about 24 pcf to about 34 pcf, from about 24 pcf to about 33 pcf, from about 24 pcf to about 32 pcf, from about 24 pcf to about 31 pcf, from about 24 pcf to about 30 pcf, or from about 24 pcf to about 29 pcf.

The pregelatinized, partially hydrolyzed starches prepared in accordance with embodiments of the invention can be added to slurry to provide strength enhancement to product according to the invention, which can be especially beneficial at lower weight/density. For example, in some embodiments, the board made according to embodiments of the invention has a compressive strength of at least about 400 psi (2,750 kPa) at a density of 29 pcf as tested according to the method set forth in Example 4. Advantageously, in various embodiments at various board densities as described herein, the board produced by the inventive method can be prepared to have a compressive strength of at least about 400 psi, e.g., at least about 450 psi (3,100 kPa), at least about 500 psi (3,450 kPa), at least about 550 psi (3,800 kPa), at least about 600 psi (4,100 kPa), at least about 650 psi (4,500 kPa), at least about 700 psi (4,800 kPa), at least about 750 psi (5,200 kPa), at least about 800 psi (5,500 kPa), at least about 850 psi (5,850 kPa), at least about 900 psi (6,200 kPa), at least about 950 psi (6,550 kPa), or at least about 1,000 psi (6,900 kPa). In addition, in some embodiments, the compressive strength can be bound by any two of the foregoing points. For example, the compressive strength can be between about 450 psi and about 1,000 psi (e.g., between about 500 psi and about 900 psi, between about 600 psi and about 800 psi, etc.).

In some embodiments, board made according to the invention meets test protocols according to ASTM Standard C473-10. For example, in some embodiments, when the board is cast at a thickness of ½ inch, the board has a nail pull resistance of at least about 65 lb as determined according to ASTM C473-10, e.g., at least about 68 lb, at least about 70 lb, at least about 72 lb, at least about 75 lb, at least about 77 lb, etc. In various embodiments, the nail pull resistance can be from about 68 lb to about 100 lb, e.g., from about 68 lb to about 95 lb, from about 68 lb to about 90 lb, from about 68 lb to about 85 lb, from about 68 lb to about 80 lb, from about 68 lb to about 77 lb, from about 68 lb to about 75 lb, from about 68 lb to about 72 lb, from about 68 lb to about 70 lb, from about 70 lb to about 100 lb. from about 70 lb to about 95 lb, from about 70 lb to about 90 lb, from about 70 lb to about 85 lb, from about 70 lb to about 80 lb, from about 70 lb to about 77 lb, from about 70 lb to about 75 lb, from about 70 lb to about 72 lb, from about 72 lb to about 100 lb, from about 72 lb to about 95 lb, from about 72 lb to about 90 lb, from about 72 lb to about 85 lb, from about 72 lb to about 80 lb, from about 72 lb to about 77 lb, from about 72 lb to about 75 lb, from about 75 lb to about 100 lb, from about 75 lb to about 95 lb, from about 75 lb to about 90 lb, from about 75 lb to about 85 lb, from about 75 lb to about 80 lb, from about 75 lb to about 77 lb, from about 77 lb to about 100 lb, from about 77 lb to about 95 lb, from about 77 lb to about 90 lb, from about 77 lb to about 85 lb, or from about 77 lb to about 80 lb.

With respect to flexural strength, in some embodiments, when cast in a board of ½ inch thickness, the board has a flexural strength of at least about 36 lb in a machine direction (e.g., at least about 38 lb, at least about 40 lb, etc) and/or at least about 107 lb (e.g., at least about 110 lb, at least about 112 lb, etc) in a cross-machine direction as determined according to the ASTM standard C473. In various embodiments, the board can have a flexural strength in a machine direction of from about 36 lb to about 60 lb, e.g., from about 36 lb to about 55 lb, from about 36 lb to about 50 lb, from about 36 lb to about 45 lb, from about 36 lb to about 40 lb, from about 36 lb to about 38 lb, from about 38 lb to about 60 lb, from about 38 lb to about 55 lb, from about 38 lb to about 50 lb, from about 38 lb to about 45 lb, from about 38 lb to about 40 lb, from about 40 lb to about 60 lb, from about 40 lb to about 55 lb, from about 40 lb to about 50 lb, or from about 40 lb to about 45 lb. In various embodiments, the board can have a flexural strength in a cross-machine direction of from about 107 lb to about 130 lb, e.g., from about 107 lb to about 125 lb, from about 107 lb to about 120 lb, from about 107 lb to about 115 lb, from about 107 lb to about 112 lb, from about 107 lb to about 110 lb, from about 110 lb to about 130 lb, from about 110 lb to about 125 lb, from about 110 lb to about 120 lb, from about 110 lb to about 115 lb, from about 110 lb to about 112 lb, from about 112 lb to about 130 lb, from about 112 lb to about 125 lb, from about 112 lb to about 120 lb, or from about 112 lb to about 115 lb.

In addition, in some embodiments, board can have an average core hardness of at least about 11 lb, e.g., at least about 12 lb, at least about 13 lb, at least about 14 lb, at least about 15 lb, at least about 16 lb, at least about 17 lb, at least about 18 lb, at least about 19 lb, at least about 20 lb, at least about 21 lb, or at least about 22 lb, as determined according to ASTM C473-10. In some embodiments, board can have a core hardness of from about 11 lb to about 25 lb, e.g., from about 11 lb to about 22 lb, from about 11 lb to about 21 lb, from about 11 lb to about 20 lb, from about 11 lb to about 19 lb, from about 11 lb to about 18 lb, from about 11 lb to about 17 lb, from about 11 lb to about 16 lb, from about 11 lb to about 15 lb. from about 11 lb to about 14 lb, from about 11 lb to about 13 lb, from about 11 lb to about 12 lb, from about 12 lb to about 25 lb, from about 12 lb to about 22 lb. from about 12 lb to about 21 lb, from about 12 lb to about 20 lb, from about 12 lb to about 19 lb, from about 12 lb to about 18 lb, from about 12 lb to about 17 lb, from about 12 lb to about 16 lb, from about 12 lb to about 15 lb, from about 12 lb to about 14 lb, from about 12 lb to about 13 lb, from about 13 lb to about 25 lb, from about 13 lb to about 22 lb, from about 13 lb to about 21 lb, from about 13 lb to about 20 lb, from about 13 lb to about 19 lb, from about 13 lb to about 18 lb, from about 13 lb to about 17 lb, from about 13 lb to about 16 lb, from about 13 lb to about 15 lb, from about 13 lb to about 14 lb, from about 14 lb to about 25 lb, from about 14 lb to about 22 lb, from about 14 lb to about 21 lb, from about 14 lb to about 20 lb, from about 14 lb to about 19 lb, from about 14 lb to about 18 lb, from about 14 lb to about 17 lb, from about 14 lb to about 16 lb, from about 14 lb to about 15 lb, from about 15 lb to about 25 lb, from about 15 lb to about 22 lb, from about 15 lb to about 21 lb, from about 15 lb to about 20 lb, from about 15 lb to about 19 lb, from about 15 lb to about 18 lb, from about 15 lb to about 17 lb, from about 15 lb to about 16 lb, from about 16 lb to about 25 lb, from about 16 lb to about 22 lb, from about 16 lb to about 21 lb, from about 16 lb to about 20 lb, from about 16 lb to about 19 lb, from about 16 lb to about 18 lb, from about 16 lb to about 17 lb, from about 17 lb to about 25 lb, from about 17 lb to about 22 lb, from about 17 lb to about 21 lb, from about 17 lb to about 20 lb, from about 17 lb to about 19 lb, from about 17 lb to about 18 lb, from about 18 lb to about 25 lb, from about 18 lb to about 22 lb, from about 18 lb to about 21 lb, from about 18 lb to about 20 lb, from about 18 lb to about 19 lb, from about 19 lb to about 25 lb, from about 19 lb to about 22 lb, from about 19 lb to about 21 lb, from about 19 lb to about 20 lb, from about 21 lb to about 25 lb, from about 21 lb to about 22 lb. or from about 22 lb to about 25 lb.

Due at least in part to the mid-range viscosity characteristic that results in some embodiments of the invention, these standards (e.g., nail pull resistance, flexural strength, and core hardness) can be met even with respect to ultra light density board (e.g., about 31 pcf or less) as described herein.

It has also been found by the inventors that pregelatinized, partially hydrolyzed starches prepared in accordance with embodiments of the invention demonstrate temperature rise set (TRS) hydration rates that are comparable to or surpass those of conventional pregelatinized starches prepared according to a different method. The desired setting time may depend on the formulation, and the desired setting time can be determined by one of ordinary skill in the art depending on plant conditions and available raw materials.

Product according to embodiments of the invention can be made on typical manufacturing lines. For example, board manufacturing techniques are described in, for example, U.S. Pat. No. 7,364,676 and U.S. Patent Application Publication 2010/0247937. Briefly, in the case of gypsum board, the process typically involves discharging a cover sheet onto a moving conveyor. Since gypsum board is normally formed "face down," this cover sheet is the "face" cover sheet in such embodiments.

Dry and/or wet components of the gypsum slurry are fed to a mixer (e.g., pin mixer), where they are agitated to form the gypsum slurry. The mixer comprises a main body and a discharge conduit (e.g., a gate-canister-boot arrangement as known in the art, or an arrangement as described in U.S. Pat. Nos. 6,494,609 and 6,874,930). In some embodiments, the discharge conduit can include a slurry distributor with either a single feed inlet or multiple feed inlets, such as those described in U.S. Patent Application Publication 2012/0168527 A1 (application Ser. No. 13/341,016) and U.S. Patent Application Publication 2012/0170403 A1 (application Ser. No. 13/341,209), for example. In those embodiments, using a slurry distributor with multiple feed inlets, the discharge conduit can include a suitable flow splitter, such as those described in U.S. Patent Application Publication 2012/0170403 A1. Foaming agent can be added in the discharge conduit of the mixer (e.g., in the gate as described, for example, in U.S. Pat. Nos. 5,683,635 and 6,494,609) or in the main body if desired. Slurry discharged from the discharge conduit after all ingredients have been added, including foaming agent, is the primary gypsum slurry and will form the board core. This board core slurry is discharged onto the moving face cover sheet.

The face cover sheet may bear a thin skim coat in the form of a relatively dense layer of slurry. Also, hard edges, as known in the art, can be formed, e.g., from the same slurry stream forming the face skim coat. In embodiments where foam is inserted into the discharge conduit, a stream of secondary gypsum slurry can be removed from the mixer body to form the dense skim coat slurry, which can then be used to form the face skim coat and hard edges as known in the art. If included, normally the face skim coat and hard edges are deposited onto the moving face cover sheet before the core slurry is deposited, usually upstream of the mixer. After being discharged from the discharge conduit, the core slurry is spread, as necessary, over the face cover sheet (optionally bearing skim coat) and covered with a second cover sheet (typically the "back" cover sheet) to form a wet assembly in the form of a sandwich structure that is a board precursor to the final product. The second cover sheet may optionally bear a second skim coat, which can be formed from the same or different secondary (dense) gypsum slurry as for the face skim coat, if present. The cover sheets may be formed from paper, fibrous mat or other type of material (e.g., foil, plastic, glass mat, non-woven material such as blend of cellulosic and inorganic filler, etc.).

The wet assembly thereby provided is conveyed to a forming station where the product is sized to a desired thickness (e.g., via forming plate), and to one or more knife sections where it is cut to a desired length. The wet assembly is allowed to harden to form the interlocking crystalline matrix of set gypsum, and excess water is removed using a drying process (e.g., by transporting the assembly through a kiln). Surprisingly and unexpectedly, it has been found that board prepared according to the invention with pregelatinized, partially hydrolyzed starch prepared in accordance with embodiments of the invention requires significantly less time in a drying process because of the low water demand characteristic of the starch. This is advantageous because it reduce energy costs.

It also is common in the manufacture of gypsum board to use vibration in order to eliminate large voids or air pockets from the deposited slurry. Each of the above steps, as well as processes and equipment for performing such steps, are known in the art.

The pregelatinized, partially hydrolyzed starch prepared in accordance with embodiments of the invention can be used in formulating various products, such as, for example, gypsum wallboard, acoustical (e.g., ceiling) tile, joint compound, gypsum-cellulosic fiber products, such as gypsum-wood fiber wallboard, and the like. In some embodiments, such product can be formed from slurry according to embodiments of the invention.

As such, pregelatinized, partially hydrolyzed starch prepared in an extruder in accordance with embodiments of the invention can have beneficial effect, as described herein, in product besides paper-faced gypsum board in embodiments of the invention. For example, pregelatinized, partially hydrolyzed starch prepared in accordance with embodiments of the invention can be used in mat-faced products (e.g., woven) where board cover sheets are in the form of fibrous mats. The mats can optionally bear a finish to reduce water permeability. Other ingredients that can be included in making such mat-faced product, as well as materials for the fibrous mats and methods of manufacture, are discussed in, e.g., U.S. Pat. No. 8,070,895, as well as U.S. Patent Application Publication 2009/0247937, In addition, gypsum-cellulosic product can be in the form of cellulosic host particles (e.g., wood fibers), gypsum, pregelatinized, partially hydrolyzed starch prepared in accordance with embodiments of the invention, and other ingredients (e.g., water resistant additives such as siloxanes) as desired. Other ingredients and methods of manufacture are discussed in, e.g., U.S. Pat. Nos. 4,328,178; 4,239,716; 4,392,896; 4,645,548; 5,320,677; 5,817,262; and 7,413,603.

ILLUSTRATIVE EXAMPLES OF EMBODIMENTS

In one embodiment, a method of making a pregelatinized, partially hydrolyzed starch comprises: (a) mixing at least water, non-pregelatinized starch, and a weak acid that substantially avoids chelating calcium ions to make a wet starch precursor having a moisture content of from about 8 wt. % to about 25 wt. %; (b) feeding the wet starch precursor into an extruder; and (c) pregelatinizing and acid-modifying the wet starch precursor in the extruder at a die temperature of about 150° C. (about 300° F.) to about 210° C. (about 410° F.).

In another embodiment, the pressure inside the extruder is at least about 2,000 psi.

In another embodiment, the pregelatinized, partially hydrolyzed starch has a cold water solubility greater than about 50%.

In another embodiment, the pregelatinized, partially hydrolyzed starch has a cold water viscosity (10% solids, 25° C.) of from about 10 Brabender Unit (BU) to about 120 BU.

In another embodiment, the pregelatinized, partially hydrolyzed starch has a viscosity characteristic of from about 20 centipoise to about 700 centipoise when the viscosity is measured while the starch is subjected to the conditions according to the VMA method.

In another embodiment, the pregelatinized, partially hydrolyzed starch has a viscosity (10% solids, 93° C.) of from about 5 BU to about 33 BU.

In another embodiment, the weak acid that substantially avoids chelating calcium ions comprises alum.

In another embodiment, tartaric acid is included in the mixing to form the wet starch precursor.

In another embodiments, the weak acid that substantially avoids chelating calcium ions is in an amount of from about 0.5 wt. % to about 5 wt. % by weight of the starch.

In another embodiment, the wet starch has a moisture content of from about 10 wt. % to about 20 wt. % by weight of the starch precursor.

In another embodiment, the pregelatinizing and acid-modifying occurs at a die temperature of from at least about 175° C. (about 350° F.) to about 205° C. (about 400° F.) in the extruder.

In another embodiment, the output of the pregelatinized, partially hydrolyzed starch is at least about 100 kg/hr in the extruder.

In another embodiment, the pregelatinizing and acid-modifying occurs in less than about 5 minutes.

In another embodiment, the pregelatinizing and acid-modifying occurs in less than about 1 minute.

In another embodiment, the method is free of a purification step for the pregelatinized, partially hydrolyzed starch.

In another embodiment, the method is free of a neutralization step for the pregelatinized, partially hydrolyzed starch.

In another embodiment, the pregelatinized, partially hydrolyzed starch is at least about 70% gelatinized.

In another embodiment, a pregelatinized, partially hydrolyzed starch is prepared according to embodiments of the invention.

In another embodiment, a method of making a pregelatinized, partially hydrolyzed starch comprises: (a) mixing at least water, non-pregelatinized starch, and a strong acid to make a wet starch precursor having a moisture content of from about 8 wt. % to about 25 wt. %, wherein the strong acid is in an amount of about 0.05 wt. % or less by weight of the starch; (b) feeding the wet starch precursor into an extruder; and (c) pregelatinizing and acid-modifying the wet starch in the extruder at a die temperature of about 150° ((about 300° F.) to about 210° C. (about 410° F.).

In another embodiment, a method of making a pregelatinized, partially hydrolyzed starch comprises: (a) mixing at least water, non-pregelatinized starch, and a strong acid to make a wet starch precursor having a moisture content of from about 8 wt. % to about 25 wt. %, wherein the strong acid is in an amount of about 0.01 wt. % or less by weight of the starch; (b) feeding the wet starch precursor into an extruder; and (c) pregelatinizing and acid-modifying the wet starch in the extruder at a die temperature of about 150° C. (about 300° F.) to about 210° C. (about 410° F.).

In another embodiment, the strong acid has a pKa of about −1.7 or less.

In another embodiment, the strong acid is sulfuric acid, nitric acid, hydrochloric acid, or any combination thereof.

In another embodiment, the method of making board comprises: (a) forming a pregelatinized, partially hydrolyzed starch by (i) mixing at least water, non-pregelatinized starch, and an acid to form a wet starch precursor having a moisture content of from about 8 wt. % to about 25 wt. %, the acid selected from the group consisting of: (1) a weak acid that substantially avoids chelating calcium ions, (2) a strong acid in an amount of about 0.05 wt. % or less by weight of the starch, or (3) any combination thereof; (ii) feeding the wet starch precursor into an extruder; and (iii) pregelatinizing and acid-modifying the wet starch in the extruder having a die at a temperature of about 150° C. (about 300° F.) to about 210° C. (about 410° F.); (b) mixing the pregelatinized and partially hydrolyzed starch with at least water and stucco to form a slurry; (c) disposing the slurry between a first cover sheet and a second cover sheet to form a wet assembly; (d) cutting the wet assembly into a board; and (e) drying the board.

In another embodiment, the strong acid is in an amount of about 0.01 wt. % or less by weight of the starch.

In another embodiment, a method of making board comprises (a) forming a pregelatinized, partially hydrolyzed starch by (i) mixing at least water, non-pregelatinized starch, and a weak acid that substantially avoids chelating calcium ions to make a wet starch precursor having a moisture content of from about 8 wt. % to about 25 wt. %; (ii) feeding the wet starch into an extruder; and (iii) pregelatinizing and acid-modifying the wet starch in an extruder having a die at a temperature of about 150° C. (about 300° F.) to about 210° C. (about 410° F.); (b) mixing the pregelatinized and partially hydrolyzed starch with at least water and stucco to form a slurry; (c) disposing the slurry between a first cover sheet and a second cover sheet to form a wet assembly; (d) cutting the wet assembly into a board; and (e) drying the board.

In another embodiment, the method of making board comprises: (a) mixing at least water, non-pregelatinized starch, and a strong acid to make a wet starch precursor having a moisture content of from about 8 wt. % to about 25 wt. %, wherein the strong acid is in an amount of about 0.05 wt. % or less by weight of the starch; (ii) feeding the wet starch precursor into an extruder; and (iii) pregelatinizing and acid-modifying the wet starch in the extruder having a die at a temperature of about 150° C. (about 300° F.) to about 210° C. (about 410° F.); (b) mixing the pregelatinized and partially hydrolyzed starch with at least water and stucco to form a slurry; (c) disposing the slurry between a first cover sheet and a second cover sheet to from a wet assembly; (d) cutting the wet assembly into a board; and (e) drying the board.

In another embodiment, the strong acid is in an amount of about 0.01 wt. % or less by weight of the starch.

In another embodiment, the set gypsum core has a compressive strength greater than a set gypsum core made with a starch prepared under a different method.

In another embodiment, the pregelatinized, partially hydrolyzed starch is at least about 70% gelatinized when added to the slurry, with additional gelatinization taking place in the drying step.

In another embodiment, the pregelatinized, partially hydrolyzed starch is fully gelatinized when added to the slurry.

In another embodiment, the board has a compressive strength of at least about 400 psi (2,800 kPa) at a density of 29 pcf.

In another embodiment, the board has a core hardness of at least about 11, as determined according to ASTM C473-10.

In another embodiment, the board has a density of from about 21 pcf to about 35 pcf.

In another embodiment, the slurry further comprises sodium trimetaphosphate.

In another embodiment, the amount of water needed to be added to maintain the slurry fluidity at the same level it would be without the pregelatinized, partially hydrolyzed starch, is less than the increase in the amount of water needed when using a pregelatinized, partially hydrolyzed starch prepared according to a different method.

In another embodiment, the starch is in an amount of from about 0.5% to about 10% by weight based on the weight of the stucco.

In another embodiment, a wallboard is prepared according to embodiments of the invention.

It shall be noted that the preceding are merely examples of embodiments. Other exemplary embodiments are apparent from the entirety of the description herein. It will also be understood by one of ordinary skill in the art that each of these embodiments may be used in various combinations with the other embodiments provided herein.

The following examples further illustrate the invention but, of course, should not be construed as in any way limiting its scope.

Example 1

This Example illustrates the preparation of pregelatinized, partially hydrolyzed starches in accordance with embodiments of the invention.

Nine pregelatinized, partially hydrolyzed starches prepared in accordance with embodiments of the invention were prepared for various tests of specific properties (e.g., viscosity, fluidity, strength). These nine inventive starches were tested alongside three commercially available starches.

In accordance with the inventive method of preparing pregelatinized, partially hydrolyzed starch, wet starch precursors were prepared by mixing a determined corn flour commercially available as CCM 260 Yellow Corn Meal from Bunge North America (St. Louis, Mo.) in an amount of 100 kg, varying amounts of aluminum sulfate (alum), a weak acid that substantially avoids chelating with calcium ions, and/or tartaric acid (less than 20 wt. % of the total of weak acids), and varying amounts of water. The wet starch precursors were fed into a single screw extruder commercially available as Advantage 50 from American Extrusion International (South Beloit, Ill.). In the extruder, the wet starch precursors were pregelatinized and acid-modified in a single step, such that they occurred simultaneously.

Table 4 below describes the parameters of the extrusion of the corn flour in the presence of acid. The residence time of extrusion (i.e., the time for pregelatinization and acid-modification) was less than 30 seconds. All percents are based on the total weight of the starch, except moisture, which is based on the total wet weight, expressed as the sum of water, starch, and other additives.

The resulting pregelatinized, partially hydrolyzed starches were evaluated against a conventional pregelatinized corn starch having a viscosity of 773 centipoise designated Composition 1A (comparative), as well as two low water-demand starches prepared by extrusion of acid-modified corn starches, commercially available as Clinton 277 (ADM, Chicago, Ill.) and Caliber 159 (Cargill, Wayzata, Minn.), designated Composition 1B (comparative) and Composition 1C (comparative), respectively.

TABLE 4

| Substrate | Corn Flour |
|---|---|
| Canola oil | 0.25 wt. % |
| Liquid alum | 1 wt. %-4 wt. % |
| Tartaric acid | 0 wt. %-0.3 wt. % |
| Moisture of starch during extrusion | 10 wt. %-20 wt. % |
| Main screw (RPM) | 350 |
| Feed auger speed (RPM) | 14 |
| Die temperature (° F.) | 350-370 |
| Knife speed (RPM) | 400-1,000 |

Pregelatinized, partially hydrolyzed starches, designated Compositions 1D-1L, were produced in the extrusion process.

Table 5 below details the various moisture contents for extrusion and acid contents during extrusion for Compositions 1D-1L. Compositions 1D-1H and 1L were prepared with a moisture content of 16 wt. %, while Compositions 1I-1K were prepared with a moisture content of 13 wt. %. Compositions 1D-1G and Compositions 1I-1L were prepared with liquid alum in an amount of ranging from 1 wt. % to 4 wt. %, while Composition 1H included liquid alum and tartaric acid. Compositions 1F and 1L were prepared using the same moisture content and amount of acid, but in Example 3 had different amounts of retarder.

TABLE 5

| Composition | Moisture | Acid |
| --- | --- | --- |
| Composition 1A | 16 wt. % | NA |
| Composition 1B | 19 wt. % | NA |
| Composition 1C | 19 wt. % | NA |
| Composition 1D | 16 wt. % | 1 wt. % alum |
| Composition 1E | 16 wt. % | 2 wt. % alum |
| Composition 1F | 16 wt. % | 3 wt. % alum |
| Composition 1G | 16 wt. % | 4 wt. % alum |
| Composition 1H | 16 wt. % | 2 wt. % alum; 0.3 wt. % tartaric acid |
| Composition 1I | 13 wt. % | 1 wt. % alum |
| Composition 1J | 13 wt. % | 2 wt. % alum |
| Composition 1K | 13 wt. % | 3 wt. % alum |
| Composition 1L | 16 wt. % | 3 wt. % alum |

Examples 2-4 below test the Compositions described in Table 5 for various properties. In Example 2, Compositions 1B-1L were evaluated with regards to viscosity in amylograph tests. Example 3 tested slurries prepared with one of Compositions 1A, 1D-1I, and 1K-1L for fluidity, which was evaluated by means of a slump test. This data was then further corroborated by measuring the time to 50% hydration for the slurries. This illustrated how much time it took for the slurries to set. Example 4 tested slurries prepared with Compositions 1A, 1D-1I, and 1K for strength, which was evaluated by means of a compressive strength test described herein.

Example 2

This example illustrates the viscosity of pregelatinized, partially hydrolyzed starches prepared in an extruder in accordance with embodiments of the invention. Compositions 1D-1K were tested in comparison to extruded commercially available acid-modified starches (Compositions 1B-1C), specifically with regards to how viscosity changes based on the amount of acid (e.g., alum) and moisture content, defined by the level of moisture of the wet starch that is fed through the extruder.

In preparation for testing, the Compositions were mixed with water into a starch slurry, such that the starch slurries contained the Compositions in an amount of 10 wt. %. It will be noted that the term "solution" is used when the starch is fully gelatinized and completely dissolved and the term "slurry" is used when the starch is not completely dissolved. Each Composition was then tested for viscosity at different temperatures by the Amylograph technique described herein. The results of the tests were plotted in FIGS. 1 and 2, which are amylograms evaluating the viscosity of pregelatinized, partially hydrolyzed starches at different temperatures by plotting viscosity (left y-axis) and temperature (right y-axis) versus time (x-axis). The temperature curve is overlaid against each sample. The same temperature profile was used for each sample. The other curves show the viscosity of the starches.

The initial viscosity at 25° C. was an indicator of the fluidity of a slurry system containing any one of Compositions 1B-1K. 25° C. is the temperature at which the starch will be mixed with stucco and other ingredients to make board. At this temperature, furthermore, the viscosity of the starch is negatively correlated with the fluidity of the stucco slurry.

The viscosity at trough (93° C.) was an indicator of the molecular weight of any one of Compositions 1B-1K. At a temperature of 93° C., the starch molecules are completely dissolved in water. The viscosity of the starch solutions at 93° C. is positively correlated with the molecular weight of the starch, which results from partial hydrolysis.

FIG. 1 is an amylogram plotting viscosity (left y-axis) and temperature (right y-axis) over a fifty minute period (x-axis). Comparative Compositions 1B and 1C and inventive Compositions 1D-1H, as described herein, were mixed into starch solutions in an amount of 10% by weight based on the weight of the solution. To avoid forming lumps, starch was added into the water in a mixing cup of a Waring blender while mixed at low speed for 20 seconds. The starch solutions were then evaluated using a Viscograph-E (C. W. Brabender® Instruments, Inc., South Hackensack, N.J.). According to the Brabender viscosity measurement procedure as referred to herein, viscosity is measured using a C. W. Brabender Viscograph, e.g., a Viscograph-E that uses reaction torque for dynamic measurement. It is to be noted that, as defined herein, the Brabender units are measured using a sample cup size of 16 fl. oz (about 500 cc), with a 700 cmg cartridge at an RPM of 75. One of ordinary skill in the art also will readily recognize that the Brabender units can be converted to other viscosity measurements, such as centipoises (e.g., cP=BU×2.1, when the measuring cartridge is 700 cmg) or Krebs units, as described therein. The pasting profiles of Compositions 1D-1H extruded at 16 wt. % moisture content are shown in FIG. 1 along with comparative Compositions 1B and 1C.

Considering inventive Compositions 1D-1H, as alum increased from 1 wt. % to 4 wt. %, the initial viscosity decreased from 70 Brabender Unit (BU) to 10 BU, while the molecular weight decreased as well. The initial viscosities and viscosities at 93° C. of Compositions 1D-1H were reduced as low as those of Compositions 1B and 1C. Compositions 1B and 1C represent conventional viscosity limits of low water demand starches.

The results of Compositions 1D-1H shown in FIG. 1 demonstrate that optimal acid-modification can be achieved during extrusion. These results further suggest that the inventive method of preparing pregelatinized, partially hydrolyzed starch successfully reduced the viscosity (molecular weight) of the starch. No viscosity peak was observed between 70C to 90° C., indicating that Compositions 1D-1H were fully gelatinized. Had Compositions 1D-1H not been fully gelatinized, there would have been an increase in viscosity. The full gelatinization of the starch Compositions were confirmed by differential scanning calorimetry (DSC).

Figure 2:
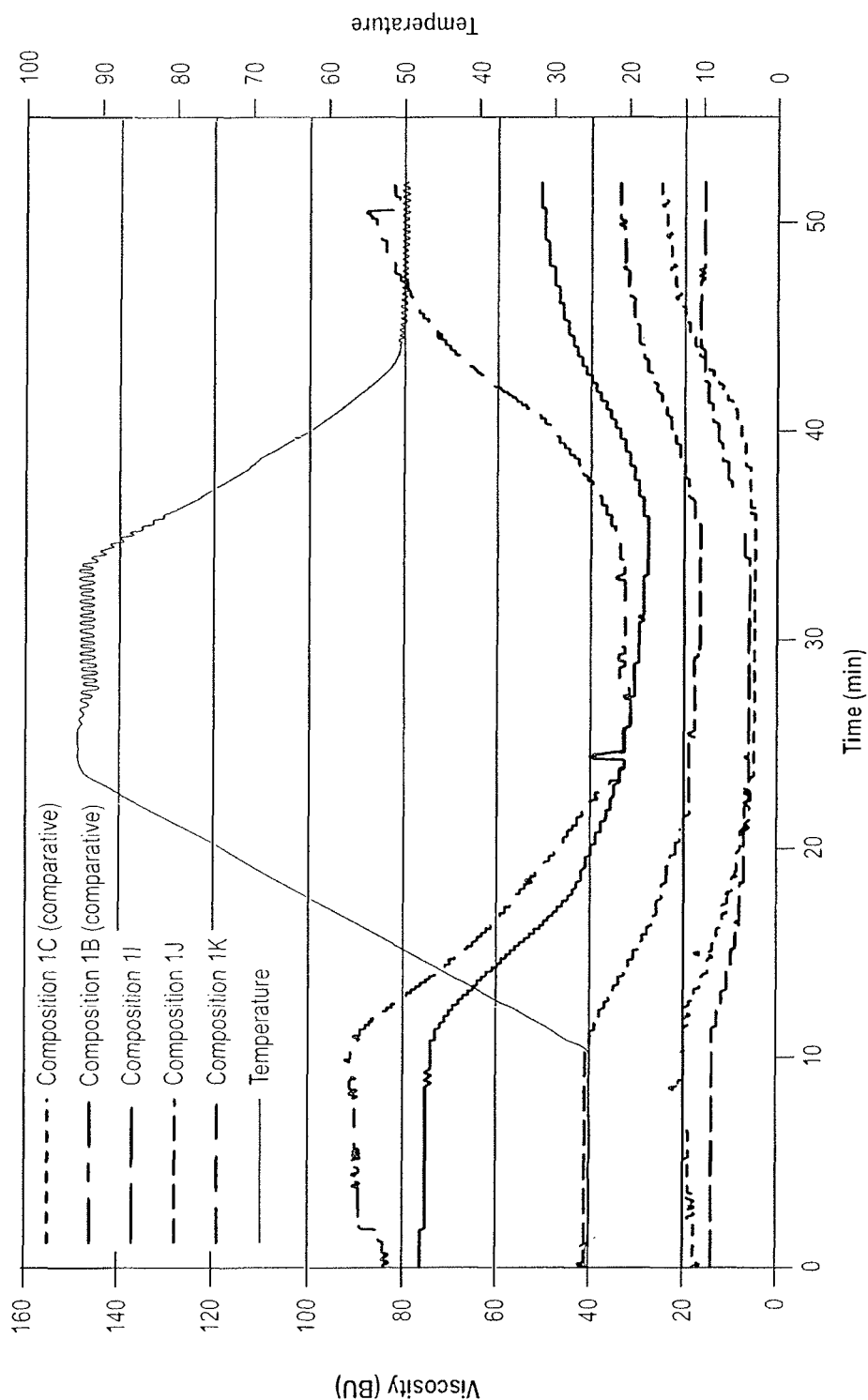
FIG. 2 is an amylogram plotting viscosity (left y-axis) and temperature (right y-axis) versus time (x-axis) that shows pasting profiles of starches extruded at a moisture content of 13 wt. % with the solid content of testing slurry being 10 wt. % as set forth in Example 2.

FIG. 2 is a second amylogram plotting viscosity (left y-axis) and temperature (right y-axis) over a fifty minute period (x-axis). Comparative Compositions 1B and 1C and inventive Compositions 1I-1K, all as described herein, were mixed into starch solutions in an amount of 10% by weight based on the weight of the solution. To avoid forming lumps, starch was added into the water in a mixing cup of a Waring blender while mixed at low speed for 20 seconds. The starch solutions were then evaluated using a Viscograph-E. The pasting profiles of Compositions 1I-1K extruded at 13 wt. % moisture content are shown in FIG. 2 along with comparative Compositions 1B and 1C.

Similar trends observed with Compositions 1D-1H were observed with Compositions 1I-1K. In particular, the method of preparing pregelatinized, partially hydrolyzed starch in an extruder as described herein successfully reduced the viscosity of Compositions 1I-1K.

As alum increased from 1 wt. % to 3 wt. %, the initial viscosity decreased from 75 BU to 14 BU, while the molecular weight also decreased. The initial viscosities and the viscosity at 93° C. of Compositions 1I-1K were reduced as low as those of Compositions 1B and 1C.

In addition, the results of Compositions 1I-1K shown in FIG. 2 demonstrate that optimal acid-modification can be achieved during extrusion. No viscosity peak was observed between 70° C. to 90° C. indicating that Compositions 1I-1K were fully gelatinized.

Furthermore, these results show that at a lower moisture content, more starch hydrolysis can be achieved at a given acid level than at a higher moisture content because at a low moisture content there is more mechanical energy and, thus, more starch degradation, such that the starch will become smaller using the same acid level.

Example 3

This Example illustrates the fluidity of gypsum slurries containing Compositions 1A (comparative), 1D-1I, and 1K-1L. The Compositions were evaluated with regards to fluidity using a slump test that will be appreciated by one of ordinary skill in the art.

In preparation for testing, slurries were prepared with each of Compositions 1A (comparative), 1D-1I, and 1K-1L in an amount of 2 wt. % and the parameters outlined in Table 6 below, using a water stucco ratio (WSR) of 100.

TABLE 6

| Ingredient | Weight (g) |
|---|---|
| Stucco | 400 |
| Heat resistance accelerator | 4 |
| Starch | 8 |
| Sodium trimetaphosphate 10% solution | 8 |
| Dispersant | 2 |
| Retarder 1% solution | 20 |
| Gauging water | 357 |
| PFM-33 foam (0.5% solution) | 25 |

The starch was weighed into a dry mix comprising stucco having over 95% purity and heat resistance accelerator. Water, sodium trimetaphosphate (10 wt. % solution), dispersant, and retarder were weighed into the mixing bowl of a Hobart Mixer. The dry mix was poured into the mixing bowl of a mixer available as N50 5-Quart Mixer from Hobart (Troy, Ohio), soaked for 10 seconds, and mixed at speed II for 30 seconds. For foam preparation, a 0.5% solution of Hyonic® PFM-33 soap (available from GEO® Specialty Chemicals, Ambler, Pa.) was formed, and then mixed with air to make the air foam. The air foam was added to the slurry using a foam generator.

Each slurry was then put into a cylinder, having a diameter of 4.92 cm (1.95 in.) and a height of 10 cm (3.94 in.). The cylinder was then lifted, allowing the slurry to freely flow. The diameters of the slumps that formed were then measured to illustrate fluidity of the slurries and are recorded in Table 7 below. Table 8 also includes the results of a time to 50% hydration test explained in further detail below.

TABLE 7

| Composition | Retarder | Slump (cm) | Time to 50% Hydration (minutes) |
|---|---|---|---|
| Composition 1A | 0.05 wt. % | 13.7 cm (5⅜ in) | 4 |
| Composition 1D | 0.05 wt. % | 16.5 cm (6½ in) | 3.8 |
| Composition 1E | 0.05 wt. % | 15.2 cm (6 in) | 3.6 |
| Composition 1F | 0.05 wt. % | 16.2 cm (6⅜ in) | 3.7 |
| Composition 1G | 0.05 wt. % | 16.2 cm (6⅜ in) | 3.3 |
| Composition 1H | 0.05 wt. % | 17.8 cm (7 in) | 3.7 |
| Composition 1I | 0.05 wt. % | 15.9 cm (6¼ in) | 3.6 |
| Composition 1K | 0.05 wt. % | 18.4 cm (7¼ in) | 3.4 |
| Composition 1L | 0.0625 wt. % | 18.4 cm (7¼ in) | 4 |

As can be observed from Table 7, slurries prepared with Compositions 1D-1I and 1K showed larger slump sizes than the slurry prepared with Composition 1A (comparative). They also set faster than Composition 1A (comparative), indicating slurries containing Compositions 1D-1I and 1K had better fluidity than the slurry containing Composition 1A.

In addition, the time to 50% hydration was measured for the slurries for purposes of comparing the slump size when the slurries set at the same rate. The temperature profiles of the slurries were measured using software as one of ordinary skill in the art will appreciate.

This additional test was conducted to confirm that the slump tests were correct, specifically to illustrate that the large slumps observed with slurries including pregelatinized, partially hydrolyzed starches prepared in accordance with embodiments of the invention resulted from improved fluidity in comparison to Composition 1A (comparative), not slow hydration.

Composition 1H, prepared with 2 wt. % alum and 0.3 wt. % tartaric acid, effectively hydrolyzed starch to a low viscosity and had less impact on the hydration rate, because tartaric acid and alum had opposite effect on hydration rate.

Figure 3:
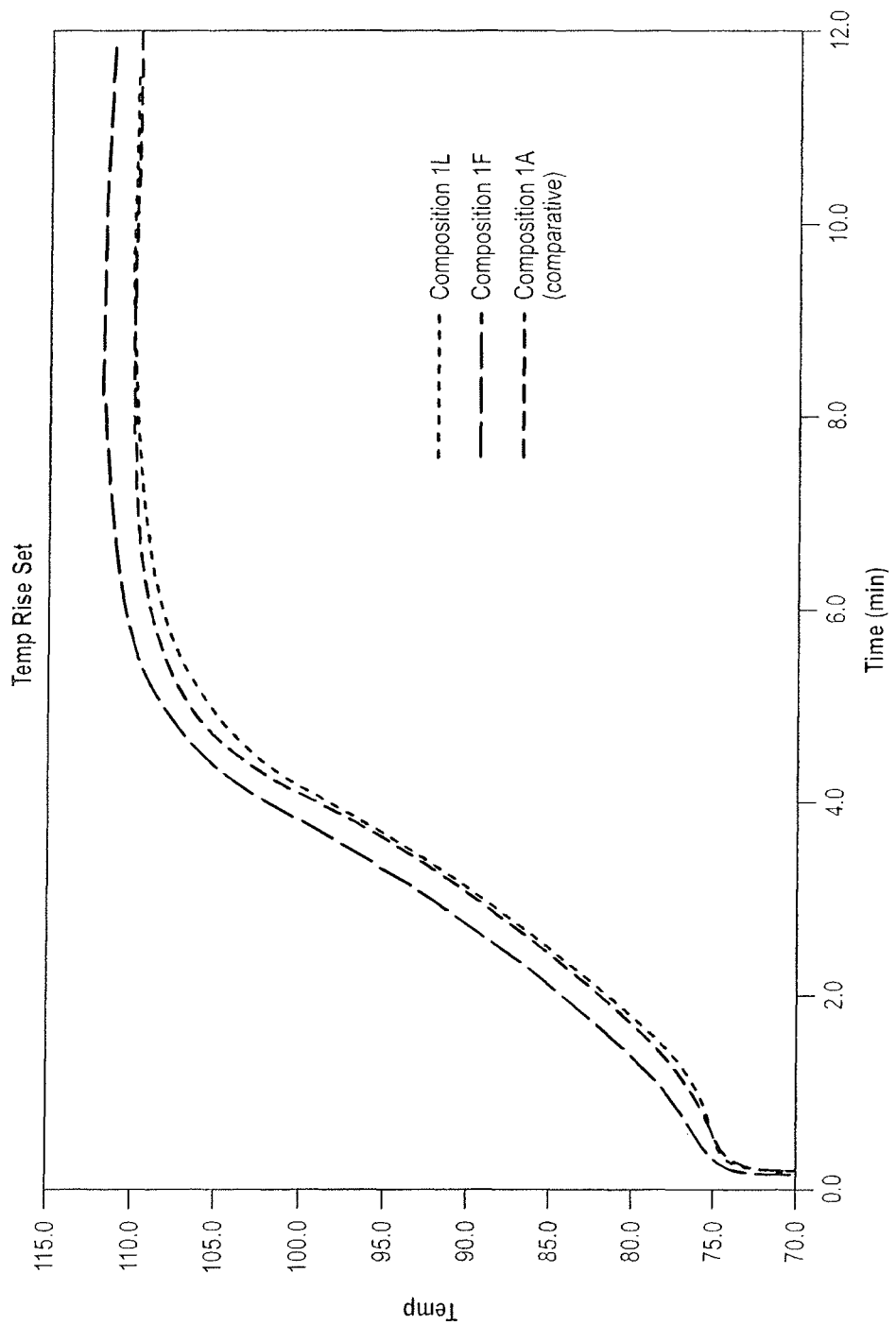
FIG. 3 is a graph plotting temperature versus time showing the temperature rise set (TRS) hydration rate of two slurries containing pregelatinized, partially hydrolyzed starches treated with alum in an amount of 3 wt. % and retarder in amounts of 0.05 wt. % and 0.0625 wt. %, respectively, and a third slurry containing a conventional pregelatinized corn starch having a viscosity of 773 centipoise and retarder in an amount of 0.05 wt. % as set forth in Example 3.

FIG. 3 is a graph plotting temperature versus time, showing the temperature rise set (TRS) hydration rate. Compositions 1F with 0.05% and 0.0625% of retarder, respectively, hydrate faster or at the same rate as Composition 1A (comparative).

As seen in FIG. 3, Composition 1L, with 0.0625 wt. % of retarder, had the same hydration rate as Composition 1A (comparative). The slump size of Composition 1L with 0.065 wt. % retarder was 18.415 cm (7¼"), was significantly larger than Composite 1A.

This result suggests that the larger slump sizes observed with slurries including pregelatinized, partially hydrolyzed starches prepared in accordance with embodiments of the invention were due to high fluidity and not to slower setting. Furthermore, pregelatinized, partially hydrolyzed starches prepared in accordance with embodiments of the invention will allow for wallboards using less water without sacrificing fluidity.

Example 4

This Example illustrates the strength of gypsum disks prepared with slurries containing Compositions 1A (comparative), 1D-1I, and 1K. Strength was evaluated using a compressive strength test described herein.

To prepare for testing, slurries were prepared with each of Compositions 1A (comparative), 1D-1I, and 1K-1L in an amount of 2 wt. % and the parameters outlined in Table 4 above.

A water stucco ratio (WSR) of 100 and air foam were used to make gypsum disks with a final density of 29 pcf. The starch was weighed into a dry mix comprising stucco and heat resistance accelerator. Water, sodium trimetaphosphate 10% solution, dispersant, and retarder were weighed into the mixing bowl of a Hobart Mixer. The dry mix was poured into the mixing bowl of a mixer available as N50 5-Quart Mixer from Hobart (Troy, Ohio), soaked for 10 seconds, and mixed at speed II for 30 seconds. For foam preparation, a 0.5% solution of Hyonic® PFM-33 soap (available from GEO® Specialty Chemicals, Ambler, Pa.) was formed, and then mixed with air to make the air foam. The air foam was added to the slurry using a foam generator. The foam generator was run at a rate sufficient to obtain the desired board density of 29 pcf. After foam addition, the slurry was immediately poured to a point slightly above the tops of the molds. The excess was scraped as soon as the plaster set. The molds had been sprayed with mold release (WD-40™). The disks had a diameter of 10.16 cm (4 in.) and a thickness of 1.27 cm (0.5 in.).

After the disks had hardened, the disks were removed from the mold, and then dried at 110° F. (43° C.) for 48 hours. After removing from the oven, the disks were allowed to cool at room temperature for 1 hour. The compressive strength was measured using a materials testing system commercially available as SATEC™ E/M Systems from MTS Systems Corporation (Eden Prairie, Minn.). The load was applied continuously and without a shock at speed of 0.04 inch/min (with a constant rate between 15 to 40 psi/s). The results are shown in Table 8 below.

TABLE 8

| Composition | Compressive Strength (PSI@29 pcf) |
|---|---|
| Composition 1A | 396 |
| Composition 1D | 439 |
| Composition 1E | 388 |
| Composition 1F | 476 |
| Composition 1G | 419 |
| Composition 1H | 417 |
| Composition 1I | 455 |
| Composition 1K | 426 |

As seen in Table 8, the foam disks containing Compositions 1D-1I and 1K had compressive strengths comparable to that which contained Composition 1A (comparative), indicating pregelatinized, partially hydrolyzed starches could reduce water demand without sacrificing their strength enhancing property. The desirable compressive strength of the disk samples is approximate 400 psi. The strength is required so that the board can be properly handled without falling apart.

The use of the terms "a" and "an" and "the" and "at least one" and similar referents in the context of describing the invention (especially in the context of the following claims) (e.g., in relation to acids, raw material starches, or other components or items) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method of making a pregelatinized, partially hydrolyzed starch comprising:
    (a) mixing at least water, non-pregelatinized unmodified starch, and a strong acid having a pKa of about −1.7 or less to make a wet starch precursor having a moisture content of from about 8 wt. % to about 25 wt. %, wherein the strong acid is in an amount of about 0.02 wt. % or less by weight of the non-pregelatinized unmodified starch;
    (b) feeding the wet starch precursor including the mixed strong acid into an extruder having a heated die, rotating screws for imparting a compressive shearing force, and a rotating knife;
    (c) pregelatinizing and acid-modifying the wet starch precursor in the extruder at a die temperature of about 150° C. to about 210° C. to form a pregelatinized partially hydrolyzed starch; and
    (d) cutting the pregelatinized, partially hydrolyzed starch formed in the extruder die with the rotating knife,
    wherein the pregelatinized, partially hydrolyzed starch is at least about 70% gelatinized, and wherein the pregelatinized, partially hydrolyzed starch has a cold water viscosity of from about 10 Brabender Unit (BU) to about 120 BU, wherein the cold water viscosity is determined by an Amylograph method for a 10% by weight solution of the starch at 25° C.

2. The method of claim 1, wherein the strong acid is sulfuric acid, nitric acid, hydrochloric acid, or any combination thereof.

3. The method of claim 1, wherein the strong acid is sulfuric acid.

4. The method of claim 1, wherein the strong acid is in an amount of from about 0.0001 wt. % to about 0.02 wt. % the non-pregelatinized unmodified starch.

5. The method of claim 4, wherein the strong acid is in an amount of from about 0.0001 wt. % to about 0.01 wt. % the non-pregelatinized unmodified starch.

6. The method of claim 1, wherein the pregelatinized, partially hydrolyzed starch has a hot water viscosity of from about 5 Brabender Unit (BU) to about 33 BU for a 10% by weight solution of the starch at 30 min and 93° C. determined by the Amylograph method.

7. The method of claim 1, wherein the pregelatinizing and acid-modifying occurs at a die temperature of from at least about 175° C. to about 205° C. in the extruder.

8. The method of claim 1, wherein an output of the pregelatinized, partially hydrolyzed starch is at least about 100 kg/hr in the extruder.

9. The method of claim 1, wherein the pregelatinizing and acid-modifying occurs in less than about 5 minutes.

10. The method of claim 1, wherein the pregelatinizing and acid-modifying occurs in less than about 1 minute.

11. The method of claim 1, wherein the method is free of purification and neutralization steps for the pregelatinized, acid-modified starch.

12. A pregelatinized, partially hydrolyzed starch prepared according to claim 1.

13. A method of making board comprising:
  (a) mixing at least water, non-pregelatinized unmodified starch, and a strong acid having a pKa of about −1.7 or less to make a wet starch precursor having a moisture content of from about 8 wt. % to about 25 wt. %, wherein the strong acid is in an amount of about 0.02 or less by weight of the starch;
  (b) feeding the wet starch precursor including the strong acid into an extruder having a heated die, rotating screws for imparting a compressive shearing force, and a rotating knife; and (iii) pregelatinizing and acid-modifying the wet starch precursor in the extruder having the die at a temperature of about 150° C. to about 210° C. to form a pregelatinized, partially hydrolyzed starch, cutting the pregelatinized, partially hydrolyzed starch formed in the extruder die using the rotating knife, wherein the pregelatinized, partially hydrolyzed starch is at least about 70% gelatinized and wherein the pregelatinized, partially hydrolyzed starch has a cold water viscosity of from about 10 Brabender Unit (BU) to about 120 BU, wherein the cold water viscosity is determined by an Amylograph method for a 10% by weight solution of the starch at 25° C.;
  (c) mixing the pregelatinized and partially hydrolyzed starch with at least water and stucco to form a slurry;
  (d) disposing the slurry between a first cover sheet and a second cover sheet to form a wet assembly;
  (e) cutting the wet assembly into a board: and
  (f) drying the board.

14. The method of claim 13, wherein the strong acid is sulfuric acid, nitric acid, hydrochloric acid, or any combination thereof.

15. The method of claim 14, wherein the strong acid is sulfuric acid.

16. The method of claim 13, wherein the strong acid is in an amount of from about 0.0001 wt. % to about 0.02 wt. % of the non-pregelatinized starch.

17. The method of claim 16, wherein the strong acid is in an amount of from about 0.0001 wt. % to about 0.01 wt. % of the non-pregelatinized starch.

18. The method of claim 13, wherein the pregelatinized, partially hydrolyzed starch has a hot water viscosity of from about 5 Brabender Unit(BU) to about 33 BU for a 10% by weight solution of the starch at 30 min and 93° C. determined by the Amylograph method.

19. The method of claim 13, wherein the board has a density of from about 21 pcf to about 35 pcf.

20. The method of claim 4, wherein the slurry further comprises sodium trimetaphosphate.

21. A board prepared according to claim 13.

* * * * *